(12) United States Patent
Yang et al.

(10) Patent No.: US 11,242,198 B2
(45) Date of Patent: Feb. 8, 2022

(54) HOUSEHOLD GOODS WITH ANTIMICROBIAL COATINGS AND METHODS OF MAKING THEREOF

(71) Applicant: simplehuman, LLC, Torrance, CA (US)

(72) Inventors: Frank Yang, Rancho Palos Verdes, CA (US); Di-Fong Chang, Torrance, CA (US); Hon-Lun Chen, Irvine, CA (US)

(73) Assignee: simplehuman, LLC, Torrance, CA (US)

( * ) Notice: Subject to any disclaimer, the term of this patent is extended or adjusted under 35 U.S.C. 154(b) by 161 days.

(21) Appl. No.: 15/343,899

(22) Filed: Nov. 4, 2016

(65) Prior Publication Data

US 2017/0127669 A1     May 11, 2017

Related U.S. Application Data

(60) Provisional application No. 62/253,612, filed on Nov. 10, 2015.

(51) Int. Cl.
*B65F 1/02* (2006.01)
*B32B 1/02* (2006.01)
(Continued)

(52) U.S. Cl.
CPC .............. *B65F 1/02* (2013.01); *A01N 59/16* (2013.01); *B05D 1/28* (2013.01); *B32B 1/02* (2013.01);
(Continued)

(58) Field of Classification Search
CPC .......... B32B 27/32; B32B 15/00; B32B 15/08; B32B 1/02; B05D 1/28; B05D 2252/00;
(Continued)

(56) References Cited

U.S. PATENT DOCUMENTS

| 830,182 A | 9/1906 | Skov |
| 1,426,211 A | 8/1922 | Pausin |

(Continued)

FOREIGN PATENT DOCUMENTS

| AU | 622536 | 4/1992 |
| AU | 365296 | 11/2015 |

(Continued)

OTHER PUBLICATIONS

Schaefer (http://www.schaeferco.com/about_rollcoaters.html) (Year: 2007).*

(Continued)

*Primary Examiner* — Walter Aughenbaugh
(74) *Attorney, Agent, or Firm* — Knobbe, Martens, Olson & Bear, LLP

(57) ABSTRACT

Various trashcans, their coatings, and coatings for other household goods are disclosed. In certain implementations, the disclosed coatings are antimicrobial. Various methods for forming antimicrobial coatings for household goods are also disclosed. In some embodiments, the antimicrobial coating comprises a substrate and an antimicrobial agent. In certain implementations the coating can be applied to a household good where the coating leaves a substantially streak-free finish. Some embodiments pertain to protective films that can be removed from a coated household good without leaving residue.

25 Claims, 10 Drawing Sheets

(51) Int. Cl.
*B65D 25/14* (2006.01)
*B05D 1/28* (2006.01)
*A01N 59/16* (2006.01)
*B32B 15/08* (2006.01)
*B65F 1/16* (2006.01)

(52) U.S. Cl.
CPC .............. *B32B 15/08* (2013.01); *B65D 25/14* (2013.01); *B65F 1/16* (2013.01); *B65F 2250/1143* (2013.01)

(58) Field of Classification Search
CPC ........ B05D 5/06; B05D 7/14; B05D 2701/00; B05D 2425/01; B05D 5/00; B05D 2350/65; B05D 5/08; B05D 7/16; B65D 25/14; B65F 1/16; B65F 1/02; B65F 1/04; B65F 1/06; B65F 1/08; B65F 2250/11; B65F 2250/111; B65F 2250/112; B65F 2250/1143; A01N 25/10; C09D 5/14; C09D 5/16; C09D 7/20; Y10T 428/12569; Y10T 29/49982; Y10T 428/1352; Y10T 428/24612; Y10T 442/2525; Y10T 428/31504; Y10T 428/31522; Y10T 428/31678; Y10T 428/2958; Y10T 428/31529
USPC ............ 220/908; 428/36.9, 36.91, 36.92, 76, 428/389, 34.1; 424/618, 622, 630, 404, 424/417, 409; 442/123
See application file for complete search history.

(56) References Cited

U.S. PATENT DOCUMENTS

| | | | |
|---|---|---|---|
| 1,461,253 | A | 7/1923 | Owen |
| 1,754,802 | A | 4/1930 | Raster |
| 1,820,555 | A | 8/1931 | Buschman |
| 1,891,651 | A | 12/1932 | Padelford et al. |
| 1,922,729 | A | 8/1933 | Geibel |
| 1,980,938 | A | 11/1934 | Geibel |
| 2,046,777 | A * | 7/1936 | Geibel ...................... B65F 1/08 220/23.87 |
| 2,308,326 | A | 1/1943 | Calcagno |
| D148,825 | S | 2/1948 | Snider |
| 2,457,274 | A | 12/1948 | Rifken |
| 2,593,455 | A | 4/1952 | James |
| 2,759,625 | A | 8/1956 | Ritter |
| 2,796,309 | A | 6/1957 | Taylor |
| 2,842,092 | A | 7/1958 | Pomper |
| 2,888,307 | A | 5/1959 | Graves et al. |
| 2,946,474 | A | 7/1960 | Knapp |
| 3,008,604 | A | 11/1961 | Garner |
| 3,023,922 | A | 3/1962 | Arrington et al. |
| 3,137,408 | A | 6/1964 | Taylor |
| 3,300,082 | A | 1/1967 | Patterson |
| 3,392,825 | A | 7/1968 | Gale et al. |
| 3,451,453 | A | 6/1969 | Heck |
| 3,654,534 | A | 4/1972 | Fischer |
| 3,800,503 | A | 4/1974 | Maki |
| 3,820,200 | A | 6/1974 | Myers |
| 3,825,150 | A | 7/1974 | Taylor |
| 3,825,215 | A | 7/1974 | Borglum |
| 3,886,425 | A | 5/1975 | Weiss |
| 3,888,406 | A | 6/1975 | Nippes |
| 3,891,115 | A | 6/1975 | Ono |
| 4,014,457 | A | 3/1977 | Hodge |
| 4,027,774 | A | 6/1977 | Cote |
| 4,081,105 | A | 3/1978 | Dagonnet et al. |
| 4,189,808 | A | 2/1980 | Brown |
| 4,200,197 | A | 4/1980 | Meyer et al. |
| 4,217,616 | A | 8/1980 | Jessup |
| 4,303,174 | A | 12/1981 | Anderson |
| 4,320,851 | A | 3/1982 | Montoya |
| 4,349,123 | A | 9/1982 | Yang |
| 4,357,740 | A | 11/1982 | Brown |
| 4,416,197 | A | 11/1983 | Kehl |
| 4,417,669 | A | 11/1983 | Knowles et al. |
| 4,457,483 | A | 7/1984 | Gagne |
| 4,535,911 | A | 8/1985 | Goulter |
| 4,570,304 | A | 2/1986 | Montreuil et al. |
| 4,576,310 | A | 3/1986 | Isgar et al. |
| D284,320 | S | 6/1986 | Kubic et al. |
| 4,609,117 | A | 9/1986 | Pamment |
| 4,630,332 | A | 12/1986 | Bisbing |
| 4,630,752 | A | 12/1986 | DeMars |
| 4,664,347 | A | 5/1987 | Brown et al. |
| 4,697,312 | A | 10/1987 | Freyer |
| 4,711,161 | A | 12/1987 | Swin et al. |
| 4,729,490 | A | 3/1988 | Ziegenbein |
| 4,753,367 | A | 6/1988 | Miller et al. |
| 4,763,808 | A | 8/1988 | Guhl et al. |
| 4,765,548 | A | 8/1988 | Sing |
| 4,765,579 | A | 8/1988 | Robbins, III et al. |
| 4,785,964 | A | 11/1988 | Miller et al. |
| 4,792,039 | A | 12/1988 | Dayton |
| 4,794,973 | A | 1/1989 | Perisic |
| 4,813,592 | A | 3/1989 | Stolzman |
| 4,823,979 | A | 4/1989 | Clark, Jr. |
| 4,834,260 | A | 5/1989 | Auten |
| 4,863,053 | A | 9/1989 | Oberg |
| 4,867,339 | A | 9/1989 | Hahn |
| 4,869,391 | A | 9/1989 | Farrington |
| 4,884,717 | A | 12/1989 | Bussard et al. |
| 4,888,532 | A | 12/1989 | Josson |
| 4,892,223 | A | 1/1990 | DeMent |
| 4,892,224 | A | 1/1990 | Graham |
| D307,344 | S | 4/1990 | Massonnet |
| 4,913,308 | A | 4/1990 | Culbertson |
| 4,915,347 | A | 4/1990 | Iqbal et al. |
| 4,918,568 | A | 4/1990 | Stone et al. |
| D308,272 | S | 5/1990 | Koepsell |
| 4,923,087 | A | 5/1990 | Burrows |
| 4,944,419 | A | 7/1990 | Chandler |
| 4,948,004 | A | 8/1990 | Chich |
| 4,964,523 | A | 10/1990 | Bieltvedt et al. |
| 4,972,966 | A | 11/1990 | Craft, Jr. |
| 4,996,467 | A | 2/1991 | Day |
| 5,031,793 | A | 7/1991 | Chen et al. |
| 5,048,903 | A | 9/1991 | Loblein |
| 5,054,724 | A | 10/1991 | Hutcheson |
| 5,065,272 | A | 11/1991 | Owen et al. |
| 5,065,891 | A | 11/1991 | Casey |
| D322,350 | S | 12/1991 | Craft, Jr. et al. |
| 5,076,462 | A | 12/1991 | Perrone |
| D323,573 | S | 1/1992 | Schneider |
| 5,090,585 | A | 2/1992 | Power |
| 5,090,785 | A | 2/1992 | Stamp |
| 5,100,087 | A | 3/1992 | Ashby |
| 5,111,958 | A | 5/1992 | Witthoeft |
| D327,760 | S | 7/1992 | Donnelly |
| D329,929 | S | 9/1992 | Knoedler et al. |
| 5,147,055 | A | 9/1992 | Samson et al. |
| 5,156,290 | A | 10/1992 | Rodrigues |
| D331,097 | S | 11/1992 | Sieren |
| 5,170,904 | A | 12/1992 | Neuhaus |
| 5,174,462 | A | 12/1992 | Hames |
| D332,852 | S | 1/1993 | Delmerico |
| D335,562 | S | 5/1993 | Evans |
| 5,213,272 | A | 5/1993 | Gallagher et al. |
| 5,222,704 | A | 6/1993 | Light |
| D337,181 | S | 7/1993 | Warman |
| 5,226,558 | A | 7/1993 | Whitney et al. |
| 5,230,525 | A | 7/1993 | Delmerico et al. |
| 5,242,074 | A | 9/1993 | Conaway et al. |
| D340,333 | S | 10/1993 | Duran et al. |
| 5,249,693 | A | 10/1993 | Gillispie et al. |
| 5,261,553 | A | 11/1993 | Mueller et al. |
| 5,265,511 | A | 11/1993 | Itzov |
| 5,295,607 | A | 3/1994 | Chang |
| 5,305,916 | A | 4/1994 | Suzuki et al. |
| 5,314,151 | A | 5/1994 | Carter-Mann |
| 5,322,179 | A | 6/1994 | Ting |
| 5,329,212 | A | 7/1994 | Feigleson |

(56) References Cited

U.S. PATENT DOCUMENTS

| | | |
|---|---|---|
| 5,348,222 A | 9/1994 | Patey |
| 5,353,950 A | 10/1994 | Taylor et al. |
| 5,372,272 A | 12/1994 | Jennings |
| 5,381,588 A | 1/1995 | Nelson |
| 5,385,258 A | 1/1995 | Sutherlin |
| 5,390,818 A | 2/1995 | LaBuda |
| 5,404,621 A | 4/1995 | Heinke |
| 5,407,089 A | 4/1995 | Bird et al. |
| 5,419,452 A | 5/1995 | Mueller et al. |
| 5,471,708 A | 12/1995 | Lynch |
| 5,474,201 A | 12/1995 | Liu |
| 5,474,797 A | 12/1995 | Sioshansi et al. |
| 5,501,358 A | 3/1996 | Hobday |
| 5,520,067 A | 5/1996 | Gaba |
| 5,520,303 A | 5/1996 | Bernstein et al. |
| 5,527,840 A * | 6/1996 | Chutko ............ C08G 59/4261 523/412 |
| 5,531,348 A | 7/1996 | Baker et al. |
| 5,535,913 A | 7/1996 | Asbach et al. |
| 5,558,254 A | 9/1996 | Anderson et al. |
| 5,560,283 A | 10/1996 | Hannig |
| 5,584,412 A | 12/1996 | Wang |
| D377,554 S | 1/1997 | Adriaansen |
| 5,611,507 A | 3/1997 | Smith |
| 5,628,424 A | 5/1997 | Gola |
| 5,632,401 A | 5/1997 | Hurd |
| 5,636,416 A | 6/1997 | Anderson |
| 5,636,761 A | 6/1997 | Diamond et al. |
| 5,644,111 A | 7/1997 | Cerny et al. |
| 5,645,186 A | 7/1997 | Powers et al. |
| 5,650,680 A | 7/1997 | Chula |
| D383,277 S | 9/1997 | Peters |
| 5,662,235 A | 9/1997 | Nieto |
| 5,671,847 A | 9/1997 | Pedersen et al. |
| 5,690,247 A | 11/1997 | Boover |
| 5,695,088 A | 12/1997 | Kasbohm |
| 5,699,929 A | 12/1997 | Ouno |
| D388,922 S | 1/1998 | Peters |
| D389,631 S | 1/1998 | Peters |
| 5,704,511 A | 1/1998 | Kellams |
| 5,724,837 A | 3/1998 | Shin |
| 5,730,312 A | 3/1998 | Hung |
| 5,732,845 A | 3/1998 | Armaly, Jr. |
| 5,735,495 A | 4/1998 | Kubota |
| 5,738,239 A | 4/1998 | Triglia |
| 5,770,935 A | 6/1998 | Smith et al. |
| 5,799,909 A | 9/1998 | Ziegler |
| 5,816,431 A | 10/1998 | Giannopoulos |
| 5,816,640 A | 10/1998 | Nishimura |
| D401,383 S | 11/1998 | Gish |
| D401,719 S | 11/1998 | Van Leeuwen et al. |
| 5,873,643 A | 2/1999 | Burgess, Jr. et al. |
| 5,881,896 A | 3/1999 | Presnell et al. |
| 5,881,901 A | 3/1999 | Hampton |
| 5,884,237 A | 3/1999 | Kanki et al. |
| 5,887,748 A | 3/1999 | Nguyen |
| D412,552 S | 8/1999 | Burrows |
| 5,961,105 A | 10/1999 | Ehrnsberger et al. |
| 5,967,392 A | 10/1999 | Niemi et al. |
| 5,987,708 A | 11/1999 | Newton |
| 6,000,569 A | 12/1999 | Liu |
| 6,010,024 A | 1/2000 | Wang |
| 6,024,238 A | 2/2000 | Jaros |
| 6,036,050 A | 3/2000 | Ruane |
| 6,102,239 A | 8/2000 | Wien |
| 6,105,859 A | 8/2000 | Stafford |
| 6,123,215 A | 9/2000 | Windle |
| D431,700 S | 10/2000 | Roudebush |
| 6,126,031 A | 10/2000 | Reason |
| 6,129,233 A | 10/2000 | Schiller |
| 6,131,861 A | 10/2000 | Fortier, Jr. et al. |
| D435,951 S | 1/2001 | Yang et al. |
| 6,209,744 B1 | 4/2001 | Gill |
| 6,211,637 B1 | 4/2001 | Studer |
| 6,234,339 B1 | 5/2001 | Thomas |
| 6,250,492 B1 | 6/2001 | Verbeek |
| D445,980 S | 7/2001 | Tjugum |
| 6,286,706 B1 | 9/2001 | Tucker |
| 6,328,320 B1 | 12/2001 | Walski et al. |
| 6,345,725 B1 | 2/2002 | Lin |
| 6,364,147 B1 | 4/2002 | Meinzinger et al. |
| 6,386,386 B1 | 5/2002 | George |
| 6,390,321 B1 | 5/2002 | Wang |
| 6,401,958 B1 | 6/2002 | Foss et al. |
| 6,519,130 B1 | 2/2003 | Breslow |
| 6,557,716 B1 | 5/2003 | Chan |
| D476,456 S | 6/2003 | Englert et al. |
| 6,596,983 B2 | 7/2003 | Brent |
| 6,612,099 B2 | 9/2003 | Stravitz |
| 6,626,316 B2 | 9/2003 | Yang |
| 6,626,317 B2 | 9/2003 | Pfiefer et al. |
| 6,632,064 B1 | 10/2003 | Walker et al. |
| D481,846 S | 11/2003 | Lin |
| D482,169 S | 11/2003 | Lin |
| 6,659,407 B2 | 12/2003 | Asaro |
| 6,681,950 B2 | 1/2004 | Miller, Jr. et al. |
| D488,604 S | 4/2004 | Yang et al. |
| D488,903 S | 4/2004 | Yang et al. |
| D489,503 S | 5/2004 | Lin |
| D489,857 S | 5/2004 | Yang et al. |
| D490,583 S | 5/2004 | Yang et al. |
| D490,954 S | 6/2004 | Brand |
| D491,706 S | 6/2004 | Yang et al. |
| 6,758,366 B2 | 7/2004 | Bourgund et al. |
| D493,930 S | 8/2004 | Wang |
| D494,723 S | 8/2004 | Lin |
| 6,774,586 B1 | 8/2004 | Shih |
| 6,785,912 B1 | 9/2004 | Julio |
| 6,812,655 B1 | 11/2004 | Wang et al. |
| 6,814,249 B2 | 11/2004 | Lin |
| D499,450 S | 12/2004 | Goodman et al. |
| 6,837,393 B1 | 1/2005 | Kuo |
| 6,857,538 B2 | 2/2005 | Lin |
| 6,859,005 B2 | 2/2005 | Boliver |
| D503,021 S | 3/2005 | Yang et al. |
| 6,866,826 B2 | 3/2005 | Moore et al. |
| 6,883,676 B2 | 4/2005 | Lin |
| D507,090 S | 7/2005 | Yang et al. |
| 6,920,994 B2 | 7/2005 | Lin |
| 6,974,948 B1 | 12/2005 | Brent |
| D513,445 S | 1/2006 | Lin |
| 6,981,606 B2 | 1/2006 | Yang et al. |
| D517,764 S | 3/2006 | Wang |
| D517,767 S | 3/2006 | Yang et al. |
| D518,266 S | 3/2006 | Yang et al. |
| 7,017,773 B2 | 3/2006 | Gruber et al. |
| 7,044,323 B2 | 5/2006 | Yang |
| D525,756 S | 7/2006 | Yang et al. |
| 7,073,677 B2 | 7/2006 | Richardson et al. |
| 7,077,283 B2 | 7/2006 | Yang et al. |
| 7,080,750 B2 | 7/2006 | Wein et al. |
| 7,086,550 B2 | 8/2006 | Yang et al. |
| D528,726 S | 9/2006 | Lin |
| 7,121,421 B2 | 10/2006 | Yang et al. |
| D531,499 S | 11/2006 | Zaidman |
| D535,799 S | 1/2007 | Epps |
| D535,800 S | 1/2007 | Yang et al. |
| 7,163,591 B2 | 1/2007 | Kim et al. |
| 7,168,591 B1 | 1/2007 | Miller |
| D537,223 S | 2/2007 | Lin |
| D537,599 S | 2/2007 | Lin |
| D537,601 S | 2/2007 | Lin |
| D537,999 S | 3/2007 | Lin |
| D538,995 S | 3/2007 | Lin |
| D539,498 S | 3/2007 | Yang et al. |
| D539,499 S | 3/2007 | Yang et al. |
| D540,001 S | 4/2007 | Zimmerman |
| D542,001 S | 5/2007 | Yang et al. |
| D542,995 S | 5/2007 | Lin |
| D543,673 S | 5/2007 | Yang et al. |
| D544,170 S | 6/2007 | Lin |
| D544,171 S | 6/2007 | Lin |
| D544,671 S | 6/2007 | Saunders et al. |
| D545,024 S | 6/2007 | Liao |

(56) References Cited

U.S. PATENT DOCUMENTS

| | | |
|---|---|---|
| 7,225,943 B2 | 6/2007 | Yang et al. |
| D547,020 S | 7/2007 | Chen |
| 7,243,811 B1 | 7/2007 | Ramsey |
| D550,918 S | 9/2007 | Wang et al. |
| D552,319 S | 10/2007 | Gusdorf |
| D552,321 S | 10/2007 | Yang et al. |
| D552,823 S | 10/2007 | Yang et al. |
| D552,824 S | 10/2007 | Zimmerman |
| D552,825 S | 10/2007 | Yang et al. |
| D555,320 S | 11/2007 | Yang et al. |
| D557,869 S | 12/2007 | Hawker et al. |
| D559,494 S | 1/2008 | Yang et al. |
| D559,495 S | 1/2008 | Yang et al. |
| D562,522 S | 2/2008 | Daams |
| 7,328,842 B2 | 2/2008 | Wagner et al. |
| D564,169 S | 3/2008 | Wang |
| D564,723 S | 3/2008 | Yang et al. |
| D566,367 S | 4/2008 | Lin |
| D566,369 S | 4/2008 | Shek |
| D566,923 S | 4/2008 | Lin |
| D567,468 S | 4/2008 | Yang et al. |
| D568,572 S | 5/2008 | Yang et al. |
| D569,720 S | 5/2008 | Lablaine |
| 7,374,060 B2 | 5/2008 | Yang et al. |
| D571,520 S | 6/2008 | Lin |
| 7,395,990 B1 | 7/2008 | Stevens |
| 7,398,913 B2 | 7/2008 | McClure |
| 7,404,499 B1 | 7/2008 | Ramsey |
| D574,569 S | 8/2008 | Yang et al. |
| D576,371 S | 9/2008 | Zimmerman |
| D578,265 S | 10/2008 | Presnell |
| D578,266 S | 10/2008 | Yang et al. |
| D578,268 S | 10/2008 | Yang et al. |
| D578,722 S | 10/2008 | Yang et al. |
| 7,438,199 B1 | 10/2008 | Tidrick |
| D580,120 S | 11/2008 | Lin |
| D580,613 S | 11/2008 | Yang et al. |
| D580,615 S | 11/2008 | Yang et al. |
| D581,622 S | 11/2008 | Presnell et al. |
| D584,470 S | 1/2009 | Bizzell et al. |
| D585,171 S | 1/2009 | Bizzell et al. |
| D585,618 S | 1/2009 | Yang et al. |
| D586,070 S | 2/2009 | Lin |
| 7,494,021 B2 | 2/2009 | Yang et al. |
| D587,874 S | 3/2009 | Lin |
| D593,271 S | 5/2009 | Yang et al. |
| 7,530,578 B2 | 5/2009 | Niemeyer et al. |
| 7,540,396 B2 | 6/2009 | Yang et al. |
| 7,543,716 B2 | 6/2009 | Lin |
| 7,559,433 B2 | 7/2009 | Yang et al. |
| D599,074 S | 8/2009 | Bizzell et al. |
| D603,119 S | 10/2009 | Yang et al. |
| 7,607,552 B2 | 10/2009 | Efstathiou |
| D604,472 S | 11/2009 | Blanks et al. |
| 7,614,519 B2 | 11/2009 | Krauth et al. |
| 7,621,420 B2 | 11/2009 | Bandoh et al. |
| 7,656,109 B2 | 2/2010 | Yang et al. |
| D611,216 S | 3/2010 | Yang et al. |
| D611,217 S | 3/2010 | Bizzell et al. |
| D611,671 S | 3/2010 | Yang et al. |
| 7,694,838 B2 | 4/2010 | Yang et al. |
| 7,703,622 B1 | 4/2010 | Bynoe |
| D615,270 S | 5/2010 | Yang et al. |
| D615,722 S | 5/2010 | Yang et al. |
| 7,712,285 B2 | 5/2010 | Stravitz et al. |
| 7,741,801 B2 | 6/2010 | Fukuizumi |
| 7,748,556 B2 | 7/2010 | Yang et al. |
| 7,781,995 B2 | 8/2010 | Yang et al. |
| D623,817 S | 9/2010 | Yang et al. |
| D625,068 S | 10/2010 | Shannon |
| 7,806,285 B2 | 10/2010 | Yang et al. |
| D627,533 S | 11/2010 | Yang et al. |
| D627,944 S | 11/2010 | Wang et al. |
| D629,172 S | 12/2010 | Liao |
| D630,404 S | 1/2011 | Yang et al. |
| D631,221 S | 1/2011 | Yang et al. |
| D632,039 S | 2/2011 | Yang et al. |
| D632,864 S | 2/2011 | Yang et al. |
| D634,911 S | 3/2011 | Yang et al. |
| D635,319 S | 3/2011 | Meyerhoffer |
| 7,896,187 B2 | 3/2011 | Haibel |
| 7,922,024 B2 | 4/2011 | Yang et al. |
| 7,950,543 B2 | 5/2011 | Yang et al. |
| D644,390 S | 8/2011 | Smeets et al. |
| 7,992,742 B1 | 8/2011 | Kim |
| 8,006,857 B2 | 8/2011 | Lin |
| D644,806 S | 9/2011 | Yang et al. |
| D644,807 S | 9/2011 | Yang et al. |
| D649,728 S | 11/2011 | Campbell |
| 8,074,833 B2 | 12/2011 | Yang et al. |
| 8,096,445 B2 | 1/2012 | Yang et al. |
| D655,061 S | 2/2012 | Scaturro |
| 8,136,688 B2 | 3/2012 | Lee et al. |
| D657,108 S | 4/2012 | Yang et al. |
| D657,109 S | 4/2012 | Liao |
| 8,297,470 B2 | 10/2012 | Yang et al. |
| 8,317,055 B2 | 11/2012 | Zawrotny et al. |
| D672,520 S | 12/2012 | Yang et al. |
| D673,750 S | 1/2013 | Quan |
| D675,802 S | 2/2013 | Yang et al. |
| D675,803 S | 2/2013 | Yang et al. |
| 8,393,489 B1 | 3/2013 | Stravitz |
| 8,418,869 B2 | 4/2013 | Yang et al. |
| D689,255 S | 9/2013 | Sun Ting Kung et al. |
| 8,567,630 B2 | 10/2013 | Yang et al. |
| 8,569,980 B2 | 10/2013 | Yang et al. |
| 8,575,537 B2 | 11/2013 | Yao et al. |
| 8,607,932 B2 | 12/2013 | Cooper et al. |
| 8,672,171 B2 | 3/2014 | Wynn et al. |
| 8,678,219 B1 | 3/2014 | Wang et al. |
| 8,686,676 B2 | 4/2014 | Yang et al. |
| D704,406 S | 5/2014 | Kern |
| 8,716,969 B2 | 5/2014 | Yang et al. |
| 8,720,728 B2 | 5/2014 | Yang et al. |
| D709,662 S | 7/2014 | Yang et al. |
| 8,766,582 B2 | 7/2014 | Yang et al. |
| 8,807,378 B2 | 8/2014 | Kaberna |
| 8,807,379 B1 | 8/2014 | Hammond |
| D714,510 S | 9/2014 | Yang et al. |
| D715,575 S | 10/2014 | Williams et al. |
| D716,015 S | 10/2014 | van de Leest |
| 8,851,316 B2 | 10/2014 | Barrett et al. |
| 8,872,459 B2 | 10/2014 | Yang et al. |
| D725,860 S | 3/2015 | Spivey et al. |
| D725,861 S | 3/2015 | Yang et al. |
| D730,008 S | 5/2015 | Yang et al. |
| 9,051,093 B2 | 6/2015 | Yang et al. |
| D755,461 S | 5/2016 | Wall |
| D758,686 S | 6/2016 | Beumer |
| D759,934 S | 6/2016 | Yang et al. |
| D762,037 S | 7/2016 | Chen |
| D765,937 S | 9/2016 | Chen |
| D766,998 S | 9/2016 | Kao et al. |
| 9,434,538 B2 | 9/2016 | Yang et al. |
| D770,121 S | 10/2016 | Chen |
| D771,344 S | 11/2016 | Yang et al. |
| D773,145 S | 11/2016 | Yang et al. |
| 9,481,515 B2 | 11/2016 | Yang et al. |
| D773,769 S | 12/2016 | Chen |
| 9,573,759 B2 | 2/2017 | Yang et al. |
| 9,586,755 B1 | 3/2017 | Yang et al. |
| D787,828 S | 5/2017 | Thoma et al. |
| D790,145 S | 6/2017 | Chen |
| D793,642 S | 8/2017 | Yang et al. |
| D798,016 S | 9/2017 | Yang et al. |
| D804,133 S | 9/2017 | Yang et al. |
| 9,751,692 B2 | 9/2017 | Yang et al. |
| 9,790,025 B2 | 10/2017 | Yang et al. |
| 9,856,080 B2 | 1/2018 | Yang et al. |
| D820,544 S | 6/2018 | Joseph |
| D825,876 S | 8/2018 | Chen |
| D827,968 S | 9/2018 | Chen |
| D829,400 S | 9/2018 | Yang et al. |
| D830,029 S | 10/2018 | Greenspoon et al. |

(56) References Cited

U.S. PATENT DOCUMENTS

| | | | |
|---|---|---|---|
| D835,374 S | 12/2018 | Yang et al. | |
| D835,376 S | 12/2018 | Yang et al. | |
| D836,278 S | 12/2018 | Berberet et al. | |
| 10,233,018 B2 | 3/2019 | Thoma et al. | |
| 10,279,996 B2 | 5/2019 | Yang et al. | |
| 10,279,997 B2 | 5/2019 | Yang et al. | |
| D855,919 S | 8/2019 | Yang et al. | |
| D858,024 S | 8/2019 | Yang et al. | |
| D858,923 S | 9/2019 | Yang et al. | |
| D861,076 S | 9/2019 | Chen | |
| 10,472,170 B2 | 11/2019 | Yang et al. | |
| 10,494,175 B2 | 12/2019 | Yang et al. | |
| D874,776 S | 2/2020 | Spadotto | |
| 10,683,165 B2 | 6/2020 | Yang et al. | |
| 10,723,549 B2 | 7/2020 | Yang et al. | |
| D901,815 S | 11/2020 | Yang et al. | |
| 2001/0002690 A1 | 6/2001 | Rosky | |
| 2001/0020619 A1 | 9/2001 | Pfeifer et al. | |
| 2001/0045512 A1 | 11/2001 | Brent | |
| 2002/0009567 A1* | 1/2002 | Brand | A47J 36/02 |
| | | | 428/36.9 |
| 2002/0066736 A1 | 6/2002 | Pyles | |
| 2002/0092853 A1 | 7/2002 | Wang | |
| 2002/0096523 A1 | 7/2002 | Pyles | |
| 2002/0096524 A1 | 7/2002 | Hardesty | |
| 2002/0100758 A1 | 8/2002 | Pyles | |
| 2002/0104266 A1 | 8/2002 | Ranaudo | |
| 2002/0116924 A1 | 8/2002 | Winkelmann et al. | |
| 2002/0185199 A1* | 12/2002 | Myers | A01N 59/16 |
| | | | 148/537 |
| 2003/0089719 A1 | 5/2003 | Berger | |
| 2003/0102316 A1 | 6/2003 | Forest | |
| 2003/0201265 A1 | 10/2003 | Lin | |
| 2003/0205979 A1 | 11/2003 | Papari et al. | |
| 2003/0230576 A1 | 12/2003 | Lin | |
| 2004/0016756 A1 | 1/2004 | Lin | |
| 2004/0028572 A1 | 2/2004 | Sham et al. | |
| 2004/0134924 A1 | 7/2004 | Hansen et al. | |
| 2004/0140782 A1 | 7/2004 | Okabe et al. | |
| 2004/0164077 A1 | 8/2004 | Kuo | |
| 2004/0174268 A1 | 9/2004 | Scott et al. | |
| 2004/0175303 A1 | 9/2004 | Lin | |
| 2004/0199401 A1 | 10/2004 | Wagner | |
| 2004/0200938 A1 | 10/2004 | Forlivio | |
| 2004/0206758 A1 | 10/2004 | Lin | |
| 2004/0206760 A1 | 10/2004 | Gagnebin | |
| 2004/0250711 A1 | 12/2004 | Ernst | |
| 2004/0251746 A1 | 12/2004 | Ichimaru et al. | |
| 2005/0017006 A1 | 1/2005 | Kuo | |
| 2005/0017010 A1 | 1/2005 | Siegel et al. | |
| 2005/0029281 A1 | 2/2005 | Westermann et al. | |
| 2005/0129803 A1 | 6/2005 | Umeda et al. | |
| 2005/0258177 A1 | 11/2005 | Woodson | |
| 2005/0258794 A1 | 11/2005 | Fukuizumi | |
| 2006/0027579 A1 | 2/2006 | Yang et al. | |
| 2006/0103086 A1 | 5/2006 | Niemeyer et al. | |
| 2006/0110537 A1* | 5/2006 | Huang | B05D 5/00 |
| | | | 427/299 |
| 2006/0138149 A1 | 6/2006 | Tracy | |
| 2006/0156948 A1* | 7/2006 | Hendriks | A01N 25/34 |
| | | | 106/15.05 |
| 2006/0163257 A1 | 7/2006 | Golbert | |
| 2006/0175336 A1 | 8/2006 | Wang | |
| 2006/0186121 A1 | 8/2006 | Yang et al. | |
| 2006/0196874 A1 | 9/2006 | Yang | |
| 2006/0237641 A1 | 10/2006 | Moeller et al. | |
| 2006/0249510 A1 | 11/2006 | Lin | |
| 2006/0278643 A1 | 12/2006 | Chiou | |
| 2007/0012699 A1 | 1/2007 | Yang et al. | |
| 2007/0034334 A1 | 2/2007 | Ramsey et al. | |
| 2007/0045326 A1 | 3/2007 | Tramontina et al. | |
| 2007/0090112 A1 | 4/2007 | Kalman et al. | |
| 2007/0114847 A1 | 5/2007 | Ichimaru et al. | |
| 2007/0181579 A1 | 8/2007 | Kuo et al. | |
| 2007/0209846 A1 | 9/2007 | Wilson | |

| | | |
|---|---|---|
| 2007/0215622 A1 | 9/2007 | Perez |
| 2007/0241109 A1 | 10/2007 | Lin |
| 2007/0266637 A1 | 11/2007 | McGowan |
| 2007/0272691 A1 | 11/2007 | Wang et al. |
| 2007/0289972 A1 | 12/2007 | Wynn et al. |
| 2008/0011754 A1 | 1/2008 | Ramsey |
| 2008/0011910 A1 | 1/2008 | Ramsey |
| 2008/0041863 A1 | 2/2008 | Forest |
| 2008/0083756 A1 | 4/2008 | Daniels |
| 2008/0083757 A1 | 4/2008 | Parker et al. |
| 2008/0099274 A1 | 5/2008 | Seel |
| 2008/0128428 A1 | 6/2008 | Beckerman |
| 2008/0164257 A1 | 7/2008 | Boll et al. |
| 2008/0236275 A1 | 10/2008 | Breed et al. |
| 2008/0257889 A1 | 10/2008 | Kovacevich et al. |
| 2008/0257890 A1 | 10/2008 | Kovacevich et al. |
| 2008/0257891 A1 | 10/2008 | Kovacevich et al. |
| 2008/0264948 A1 | 10/2008 | Kovacevich et al. |
| 2008/0264950 A1 | 10/2008 | Kovacevich et al. |
| 2008/0272119 A1 | 11/2008 | Efstathiou |
| 2008/0272127 A1 | 11/2008 | Kovacevich et al. |
| 2009/0071959 A1 | 3/2009 | Cheung |
| 2009/0084788 A1 | 4/2009 | Yang et al. |
| 2009/0136341 A1 | 5/2009 | Kenyon |
| 2009/0214606 A1 | 8/2009 | Bujard et al. |
| 2009/0230131 A1 | 9/2009 | McDuffie et al. |
| 2009/0261105 A1 | 10/2009 | Cunningham et al. |
| 2009/0266836 A1 | 10/2009 | Mobley |
| 2010/0006572 A1 | 1/2010 | Chiou |
| 2010/0084235 A1 | 4/2010 | Lu |
| 2010/0096894 A1 | 4/2010 | Fukai |
| 2010/0122985 A1 | 5/2010 | Peters et al. |
| 2010/0147865 A1 | 6/2010 | Yang et al. |
| 2010/0170904 A1 | 7/2010 | Kalman et al. |
| 2010/0178105 A1 | 7/2010 | Monneret |
| 2010/0193518 A1 | 8/2010 | Tontarelli |
| 2010/0237074 A1 | 9/2010 | Yang et al. |
| 2010/0252557 A1 | 10/2010 | Clements |
| 2010/0294769 A1 | 11/2010 | Lee et al. |
| 2011/0017735 A1 | 1/2011 | Wang et al. |
| 2011/0049149 A1 | 3/2011 | Shih |
| 2011/0056952 A1 | 3/2011 | Borowski et al. |
| 2011/0139781 A1 | 6/2011 | Jin et al. |
| 2011/0272409 A1 | 11/2011 | Kasbohm |
| 2012/0145932 A1 | 6/2012 | Yao et al. |
| 2012/0234849 A1 | 9/2012 | Hughes et al. |
| 2012/0261423 A1 | 10/2012 | Zawrotny et al. |
| 2013/0048641 A1 | 2/2013 | Romano |
| 2013/0097809 A1 | 4/2013 | Weber et al. |
| 2013/0098913 A1 | 4/2013 | Yang et al. |
| 2013/0105487 A1 | 5/2013 | Baik |
| 2013/0240592 A1 | 9/2013 | Woodruff |
| 2013/0248535 A1 | 9/2013 | Wolfe et al. |
| 2013/0300119 A1 | 11/2013 | Anzalon et al. |
| 2014/0183193 A1 | 7/2014 | Hammond et al. |
| 2014/0238989 A1 | 8/2014 | Wang et al. |
| 2014/0305946 A1 | 10/2014 | Han |
| 2014/0345453 A1 | 11/2014 | Oh et al. |
| 2015/0251849 A1 | 9/2015 | Yang et al. |
| 2015/0259139 A1 | 9/2015 | Yang et al. |
| 2015/0321841 A1 | 11/2015 | Salas et al. |
| 2016/0200508 A1 | 7/2016 | Thoma et al. |
| 2017/0050404 A1 | 2/2017 | Henken et al. |
| 2017/0127669 A1 | 5/2017 | Yang et al. |
| 2017/0166167 A1 | 6/2017 | Heller et al. |
| 2017/0253429 A1 | 9/2017 | Yang et al. |
| 2018/0093827 A1 | 4/2018 | Yang et al. |
| 2018/0178978 A1 | 6/2018 | Yang et al. |
| 2018/0305120 A1 | 10/2018 | Yang et al. |
| 2019/0077595 A1 | 3/2019 | Wang et al. |
| 2019/0185263 A1 | 6/2019 | Yang et al. |
| 2020/0148467 A1 | 5/2020 | Yang et al. |
| 2020/0307907 A1 | 10/2020 | Yang et al. |
| 2020/0407159 A1 | 12/2020 | Yang et al. |

FOREIGN PATENT DOCUMENTS

| | | |
|---|---|---|
| AU | 201614908 | 11/2016 |
| AU | 201614909 | 11/2016 |

(56) References Cited

FOREIGN PATENT DOCUMENTS

| | | |
|---|---|---|
| CA | 2182840 | 9/1997 |
| CA | 2519295 | 3/2007 |
| CA | 132181 | 6/2010 |
| CA | 136938 | 5/2011 |
| CA | 141819 | 4/2012 |
| CA | 146601 | 2/2013 |
| CA | 152797 | 4/2014 |
| CA | 158595 | 4/2015 |
| CA | 158685 | 4/2015 |
| CA | 164264 | 10/2016 |
| CA | 164265 | 10/2016 |
| CA | 167073 | 10/2016 |
| CA | 170360 | 3/2017 |
| CA | 170399 | 3/2017 |
| CA | 168936 | 10/2017 |
| CN | 2075182 U | 4/1991 |
| CN | 1570196 A | 1/2005 |
| CN | 1918002 A | 2/2007 |
| CN | 200964993 Y | 10/2007 |
| CN | 101177946 A | 5/2008 |
| CN | 201105898 Y | 8/2008 |
| CN | 101509131 A | 8/2009 |
| CN | 201372076 Y | 12/2009 |
| CN | 201447201 U | 5/2010 |
| CN | 201512253 U | 6/2010 |
| CN | 201597962 U | 10/2010 |
| CN | 102190144 A | 9/2011 |
| CN | 301947175 S | 6/2012 |
| CN | 103072348 A | 5/2013 |
| CN | 103207416 A | 7/2013 |
| CN | 103300590 A | 9/2013 |
| CN | 103303618 A | 9/2013 |
| CN | 302771721 S | 3/2014 |
| CN | 104016030 A | 9/2014 |
| CN | 303188855 S | 4/2015 |
| CN | 303206241 S | 5/2015 |
| CN | 204587817 U | 8/2015 |
| CN | 105015986 A | 11/2015 |
| CN | 303611394 S | 3/2016 |
| CN | 303622098 S | 3/2016 |
| CN | 205169479 U | 4/2016 |
| CN | 106103299 A | 11/2016 |
| CN | 303967208 S | 12/2016 |
| CN | 304018339 S | 1/2017 |
| CN | 304018340 S | 1/2017 |
| CN | 103381944 B | 3/2017 |
| CN | 106546203 A | 3/2017 |
| CN | 107032015 A | 8/2017 |
| CN | ZL 201310076306.0 | 12/2017 |
| CN | ZL 201580000648.1 | 1/2018 |
| CN | ZL 201730168630.4 | 2/2018 |
| DE | 1610087 | 7/1950 |
| DE | 822376 | 11/1951 |
| DE | 1283741 | 7/1966 |
| DE | 8436939 | 3/1985 |
| DE | 9108341 | 10/1991 |
| DE | 4225936 | 2/1994 |
| DE | 19525885 | 3/1997 |
| DE | 19617823 | 11/1997 |
| DE | 19809331 | 5/1999 |
| DE | 29918687 | 3/2000 |
| DE | 19933180 | 1/2001 |
| DE | 10148997 | 4/2003 |
| DE | 20217561 | 3/2004 |
| DE | 10337806 A1 | 3/2005 |
| EP | 0582240 | 7/1993 |
| EP | 0903305 A1 | 3/1999 |
| EP | 0906876 A2 | 4/1999 |
| EP | 1094017 A1 | 4/2001 |
| EP | 1162161 | 12/2001 |
| EP | 1162161 A1 | 12/2001 |
| EP | 1361176 A1 | 11/2003 |
| EP | 1136393 B1 | 4/2004 |
| EP | 1447342 A2 | 8/2004 |
| EP | 1600373 A2 | 11/2005 |
| EP | 1647503 A1 | 4/2006 |
| EP | 1686073 A1 | 8/2006 |
| EP | 1918223 A1 | 5/2008 |
| EP | 1700799 B1 | 8/2009 |
| EP | 001164826-0001 | 9/2009 |
| EP | 001232904-0001 | 10/2010 |
| EP | 2343250 A1 | 7/2011 |
| EP | 001908575-0001 | 8/2011 |
| EP | 001317416-0001 | 4/2012 |
| EP | 001317416-0002 | 4/2012 |
| EP | 001335285-0001 | 7/2012 |
| EP | 001335293-0001 | 7/2012 |
| EP | 001381636-001 | 8/2013 |
| EP | 001381792-0001 | 8/2013 |
| EP | 2636611 A1 | 9/2013 |
| EP | 3144251 A1 | 3/2014 |
| EP | 001420590-0001 | 9/2014 |
| EP | 2772454 A2 | 9/2014 |
| EP | 2915763 A1 | 9/2015 |
| EP | 2918518 A2 | 9/2015 |
| EP | 002766782-0001 | 11/2015 |
| EP | 002766782-0002 | 11/2015 |
| EP | 002766881-0001 | 11/2015 |
| EP | 2364932 B1 | 4/2016 |
| EP | 3042864 A1 | 7/2016 |
| EP | 003177500-0001 | 9/2016 |
| EP | 003177500-0002 | 9/2016 |
| EP | 003362235-0001 | 10/2016 |
| EP | 003362052-0001 | 11/2016 |
| EP | 003996339-0001 | 5/2017 |
| EP | 003996339-0002 | 5/2017 |
| EP | 3199475 A3 | 8/2017 |
| EP | 3214019 A1 | 9/2017 |
| EP | 004554889-0001 | 12/2017 |
| FR | 2887152 | 12/2006 |
| GB | 191004921 | 6/1910 |
| GB | 1555543 A | 11/1979 |
| GB | 2384418 | 7/2003 |
| JP | 02-152670 | 6/1990 |
| JP | H06-56011 | 8/1994 |
| JP | 06-272888 | 9/1994 |
| JP | 2004-106713 | 4/2004 |
| JP | 2004-231237 | 8/2004 |
| JP | D1300450 | 5/2007 |
| JP | D1300451 | 5/2007 |
| JP | D1322056 | 2/2008 |
| JP | D1398668 | 10/2010 |
| JP | D1550907 | 4/2016 |
| JP | D1551184 | 4/2016 |
| JP | 1585339 | 8/2017 |
| KR | 20040087306 A | 10/2004 |
| KR | 3003841370000 | 6/2005 |
| KR | 3004095430000 | 3/2006 |
| KR | 3004095430001 | 7/2006 |
| NL | 6908550 | 12/1970 |
| TW | 183920 | 5/1992 |
| TW | 230977 | 9/1994 |
| TW | 395392 | 6/2000 |
| TW | D112733 | 9/2006 |
| TW | D129485 | 7/2009 |
| TW | D133382 | 2/2010 |
| TW | D133678 | 3/2010 |
| TW | D145989 | 3/2012 |
| TW | D147147 | 5/2012 |
| TW | D154797 | 7/2013 |
| TW | D158187 | 1/2014 |
| TW | D161587 | 7/2014 |
| TW | D162495 | 8/2014 |
| TW | D168957 | 7/2015 |
| TW | D 170334 | 9/2015 |
| TW | 201538406 | 10/2015 |
| TW | 201544405 | 12/2015 |
| TW | D176312 | 6/2016 |
| TW | D176313 | 6/2016 |
| TW | 201720729 | 6/2017 |
| TW | D183552 | 6/2017 |
| TW | D 184449 | 7/2017 |
| WO | WO 92/02430 A1 | 2/1992 |
| WO | WO 96/33671 | 10/1996 |

(56) References Cited

FOREIGN PATENT DOCUMENTS

| WO | WO 2005/080232 A1 | 9/2005 |
| WO | WO 2006/079263 A1 | 8/2006 |
| WO | WO 2007/139570 | 12/2007 |
| WO | WO 2009/114495 A1 | 9/2009 |
| WO | WO 2015/134902 A1 | 9/2015 |
| WO | WO 2015/138625 A1 | 9/2015 |
| WO | WO 2016/054109 A1 | 4/2016 |

OTHER PUBLICATIONS

U.S. Appl. No. 29/633,369, filed Jan. 12, 2018, Yang et al.
U.S. Appl. No. 29/633,372, filed Jan. 12, 2018, Yang et al.
Web page showing picture of Hero Bullet trash can, archived Nov. 17, 2004, downloaded from http://web.archive.org/web/20041117003115/http://www.simplehuman.com/images/hero_bullet.jpg.
U.S. Appl. No. 16/293,463, filed Mar. 5, 2019, Yang et al.
Agion Product Information Bulletin Regarding Agion Antimicrobial Type AC; publicly available at least as early as Oct. 2015 (in two pages).
Agion Material Safety Data Sheet; Agion Antimicrobial Type AC; publicly available at least as early as Oct. 2015 (in three pages).
Solomons, T.W. Graham, "Organic Chemistry" $6^{th}$ ed. ISBN 0-471-01342-0 (1996) in 12 pages.
Wikipedia—Chromate and Dichromate. https://en.wikipedia.org/wiki/Chromate_and_dichromate, accessed Aug. 27, 2021, printed Aug. 27, 2021 in 5 pages.
U.S. Appl. No. 29/484,903, filed Mar. 13, 2014, Yang et al.
U.S. Appl. No. 29/584,385, filed Nov. 14, 2016, Yang et al.
U.S. Appl. No. 15/476,285, filed Mar. 31, 2017, Yang et al.
U.S. Appl. No. 29/583,627, filed Jun. 22, 2017, Yang et al.
U.S. Appl. No. 29/608,587, filed Jun. 22, 2017, Yang et al.
U.S. Appl. No. 29/610,345, filed Jul. 11, 2017, Yang et al.
U.S. Appl. No. 15/809,218, filed Nov. 10, 2017, Yang et al.
Trento Corner 23 Trash Can, Hailo product webpage, May 2008, http://www.hailo.de/html/default.asp?site=12_71_107&lang=en.
Simplehuman Liner Rim Dual Bucket Rectangular Recycler with Liner Pocket, Stainless Steel, 58 Liter / 15 Gallon, Item No. CW2025, www.Amazon.com, site visited Dec. 29, 2015.

* cited by examiner

HOUSEHOLD GOODS WITH ANTIMICROBIAL COATINGS AND METHODS OF MAKING THEREOF

CROSS REFERENCE TO RELATED APPLICATIONS

The present application claims priority benefit under 35 U.S.C. § 119(e) to U.S. Provisional Application No. 62/253,612, filed Nov. 10, 2015, entitled "Antimicrobial Coatings for Household Goods and Methods of Making Thereof," which is hereby incorporated by reference in its entirety.

BACKGROUND

Field

The disclosure relates generally to the field of household goods with antimicrobial coatings and methods of making the same.

Description of the Related Art

Household goods and/or their components comprise surfaces that can be exposed to contaminants during use. For example, trashcans are often exposed to raw meat, food stuffs, and other forms of garbage. Soap dispensers are exposed to users' soiled hands. This exposure to contaminants can lead to bacterial and other microbial build-up and growth.

SUMMARY

Certain embodiments disclosed herein pertain to a coating for a household good. In some embodiments, the coating comprises a polymeric substrate configured to adhere to a surface of the household good. In some embodiments, the coating comprises an antimicrobial agent dispersed on or within the substrate.

Any of the embodiments described above, or described elsewhere herein, can include one or more of the following features.

In some embodiments, the antimicrobial agent comprises a zeolite. In some embodiments, the antimicrobial agent comprises ionic silver. In some embodiments, the antimicrobial agent comprises ionic copper. In some embodiments, the antimicrobial agent comprises ammonium.

In some embodiments, the antimicrobial agent comprises at least about 2% and/or less than or equal to about 5% weight percent of the substrate. In some embodiments, the antimicrobial agent comprises equal to or at least about 2% and/or less than or equal to about 5% ionic silver by weight. In some embodiments, antimicrobial agent comprises equal to or at least about 4.0% and/or less than or equal to about 7.0% ionic copper by weight. In some embodiments, the antimicrobial agent comprises equal to or at least about 0.1% and/or less than or equal to about 2.0% ammonium by weight. In some embodiments, the antimicrobial agent comprises a zeolite having antimicrobial ions adhered to, deposited on, or diffused therein. In some embodiments, the antimicrobial agent comprises AGION®. In some embodiments, the antimicrobial agent is present in an amount of about 1.25 wt % relative to the substrate.

In some embodiments, the polymeric substrate comprises polyethylene. In some embodiments, the polymeric substrate comprises a material that resists or makes it easier to wipe away fingerprints and smudges.

In some embodiments, the coating is sufficiently durable so that it can withstand repeated cleanings or washings without losing its antimicrobial properties.

Some embodiments pertain to a coating for a household good comprising a polymeric substrate configured to adhere to a surface of the household good and an antimicrobial agent or a combination of antimicrobial agents dispersed on or within the substrate, such as wherein the one or more antimicrobial agents comprise one or more of a zeolite, ionic silver, ionic copper, or ammonium. In some embodiments, the coating is the antimicrobial agent.

In some embodiments, the polymeric substrate comprises polyethylene.

In some embodiments, the coating comprises equal to or greater than about 0.1% and/or less than or equal to about 1.5% antimicrobial agent by weight.

In some embodiments, the antimicrobial agent comprises equal to or greater than about 68% and/or less than or equal to about 94% zeolite by weight. In some embodiments, the antimicrobial agent comprises equal to or greater than about 2% and/or less than or equal to about 5% ionic silver by weight. In some embodiments, the antimicrobial agent comprises equal to or greater than about 4.0% and/or less than or equal to about 7.0% ionic copper by weight. In some embodiments, the antimicrobial agent comprises equal to or greater than about 0.1% and/or less than or equal to about 2.0% an ammonium ion (or ammonium salt) by weight. In some embodiments, the antimicrobial agent comprises AGION®. In some embodiments, the antimicrobial agent is present in an amount of about 1.25 wt % relative to the substrate.

In some embodiments, the polymeric substrate comprises a material that resists or makes it easier to wipe away fingerprints and smudges. In some embodiments, the coating is sufficiently durable so that it can withstand repeated cleanings or washings without losing its antimicrobial properties.

Some embodiments pertain to a metal sheet comprising a coating that includes any one or more of the features described above.

Some embodiments pertain to a household product, such as a trashcan comprising a coating that includes any one or more of the features described in this specification. In some embodiments, the coating is located to the outside surface of the trashcan. In some embodiments, the trashcan comprises a metal body, the coating being located on the metal body.

Some embodiments pertain to a trashcan comprising a metal body, a lid coupled to the body and configured to move between open and closed positions, and a base on which the metal body is configured to rest. In some embodiments, an outside surface of the metal body comprises a coating, the coating comprising a substrate with an antimicrobial agent dispersed on or within the substrate, the antimicrobial agent comprising silver ions. In some embodiments, the coating is substantially even or homogeneous in thickness and/or composition and/or reflectivity across the surface of the substrate. For example, the coating can be substantially streak-free.

In some embodiments, the antimicrobial agent comprises a zeolite. In some embodiments, the substrate comprises polyethylene. In some embodiments, the antimicrobial agent comprises ionic copper. In some embodiments, the antimicrobial agent comprises ammonium. In some embodiments, the coating reduces an amount of bacteria of about $9.5 \times 10^6$ colony forming units (CFU)/carrier on the coating to less than about 5 CFU/carrier on the coating over a period of about 24 hours. In some embodiments, the coating reduces an amount of E. coli from about 2.3×10⁵ CFU/carrier to less than about 5 CFU/carrier on the coating over a period of about 24 hours.

Some embodiments pertain to a trashcan comprising a metal body forming at least a portion of a container configured to receive refuse. In some embodiments, an outside surface of the metal body comprises a coating. In some embodiments, the coating comprises a substrate with an antimicrobial agent dispersed on or within the substrate. In some embodiments, the coating is substantially even or homogeneous in thickness and/or composition and/or reflectivity across the surface of the substrate. For example, the coating can be substantially streak-free.

In some embodiments, the antimicrobial agent comprises one or more of a zeolite, ionic silver, ionic copper, or ammonium. In some embodiments, the antimicrobial agent comprises a zeolite having antimicrobial ions adhered to, deposited on, or diffused therein. In some embodiments, the antimicrobial agent comprises AGION®.

In some embodiments, the substrate comprises polyethylene.

In some embodiments, the coating is applied to a metal sheet used to prepare the metal body by applying a slurry comprising a solvent, a substrate material, and the antimicrobial agent to the metal sheet using a reverse-rolling device.

In some embodiments, the coating comprises a fingerprint resistant material or a material that allows fingerprints to be easily removed, such as by wiping without requiring a solution or excessive or forceful rubbing of the surface where the fingerprint is made.

In some embodiments, about 24 hours after bacterial exposure on the coating, an amount of bacteria remaining on the coating is at least about 95% less than upon initial exposure. In some embodiments, about 24 hours after bacterial exposure on the coating, an amount of bacteria remaining on the coating is at least about 99.99% less than upon initial exposure. In some embodiments, about 24 hours after bacterial exposure on the coating, an amount of bacteria remaining on the coating is reduced by about 95% to about 100%. In some embodiments, the coating reduces an amount of E. coli from about 2.3×10⁵ CFU/50 mm×50 mm carrier to less than or equal to about 5 CFU/carrier over a period of about 24 hours. In some embodiments, the coating reduces an amount of S. aureus from about 3.85×10⁵ CFU/50 mm×50 mm carrier to less than or equal to about 5 CFU/carrier over a period of about 24 hours.

Some embodiments pertain to methods of coating a metal surface. In some embodiments, the method of coating a metal surface comprises obtaining a solution of a polymer substrate in solvent. In some embodiments, the method comprises dispersing an antimicrobial agent on or within the solution forming a mixture. In some embodiments, the method comprises agitating the mixture to form a substantially uniform slurry. In some embodiments, the method comprises obtaining a sheet of material. In some embodiments, the method comprises applying the slurry onto the sheet of material as a layer. In some embodiments, the method comprises curing the slurry on the sheet to provide a coated sheet. In some embodiments, the resultant coated metal sheet is substantially streak-free. Some embodiments pertain to a method of manufacturing a metallic sheet having an antimicrobial coating. In some embodiments, the method comprises providing a metallic sheet. In some embodiments, the method comprises applying a slurry comprising an antimicrobial agent and a solvent onto the metallic sheet. In some embodiments, the method comprises drying the slurry on the metallic sheet to provide the antimicrobial coating. In some embodiments, the metallic sheet is shaped to provide a portion of a surface of a household good. In some embodiments, the slurry is applied to the metallic sheet using a reverse-rolling device.

In some embodiments, the method comprises applying an acrylic and/or silicone and/or silicone rubber adhesive over the coated portion of the coated metal sheet and thereafter applying a protective film over such adhesive on the coated metal sheet.

In some embodiments, the antibacterial agent used in the method comprises a zeolite (and/or any one of ionic silver, ionic copper, or ammonium).

Some embodiments pertain to a metal sheet comprising a coating, layer, and/or sheet. In some embodiments, the coating comprises a polymeric substrate configured to adhere to a surface of the household good. In some embodiments, the coating comprises an antimicrobial agent dispersed on or within the substrate. In some embodiments, the coating is an antimicrobial agent. In some embodiments, the coating comprises a protective film that protects the coating from abrasions during shipment of the metal sheet. In some embodiments, the coating comprises an acrylic and/or silicone and/or silicone rubber adhesive that adheres the protective film to the coating. In some embodiments, the adhesive leaves substantially no residue on the coating after removal of the protective film.

Some embodiments pertain to a coating for a household good comprising a coating comprising an antimicrobial agent. In some embodiments, the coating further comprises a fingerprint resistant agent, such as an agent that resists the formation of visible fingerprints and/or that an agent that allows fingerprints to be easily removed. In some embodiments, the coating is applied to a surface of a household good. Any feature, structure, component, or step that is described and/or illustrated in any embodiment in this specification can be used with or instead of any feature, structure, component, or step that is described and/or illustrated in any other embodiment in this specification. Everything disclosed and/or illustrated in this specification is intended to be interchangeable and combinable.

DETAILED DESCRIPTION OF SOME EMBODIMENTS

A variety of antimicrobial coatings and methods of forming and using the same are described below to illustrate various examples that may be employed to achieve one or more desired improvements. These examples are only illustrative and not intended in any way to restrict the general inventions presented and the various aspects and features of these inventions. Furthermore, the phraseology and terminology used herein is for the purpose of description and should not be regarded as limiting. No features, structure, or step disclosed herein is essential or indispensable.

Overview

Some embodiments disclosed herein pertain to a coating for a household good. In certain implementations, the coating is antimicrobial. As used herein, the term "antimicrobial," and its derivatives, describes the property of killing microbes and/or preventing or slowing microbial growth. As used herein, the term "microbe," and its derivatives, means an organism that is too small to be seen by the unaided eye, such as various bacteria, archaea, fungi, and protists.

As will be described in more detail below, in some embodiments, the coating comprises a substrate and an antimicrobial agent distributed in that substrate. In certain embodiments, the coating is applied to a metal (e.g., stainless steel or aluminum), which is formed into a portion of a household product (e.g., a trashcan). In some variants, the coating comprises the antimicrobial agent, substrate, and a compound that facilitates avoiding or wiping-off fingerprints. Such a combined coating can be applied to a surface (e.g., a metal sheet), which can be formed into a portion of a household product.

Figure 1:
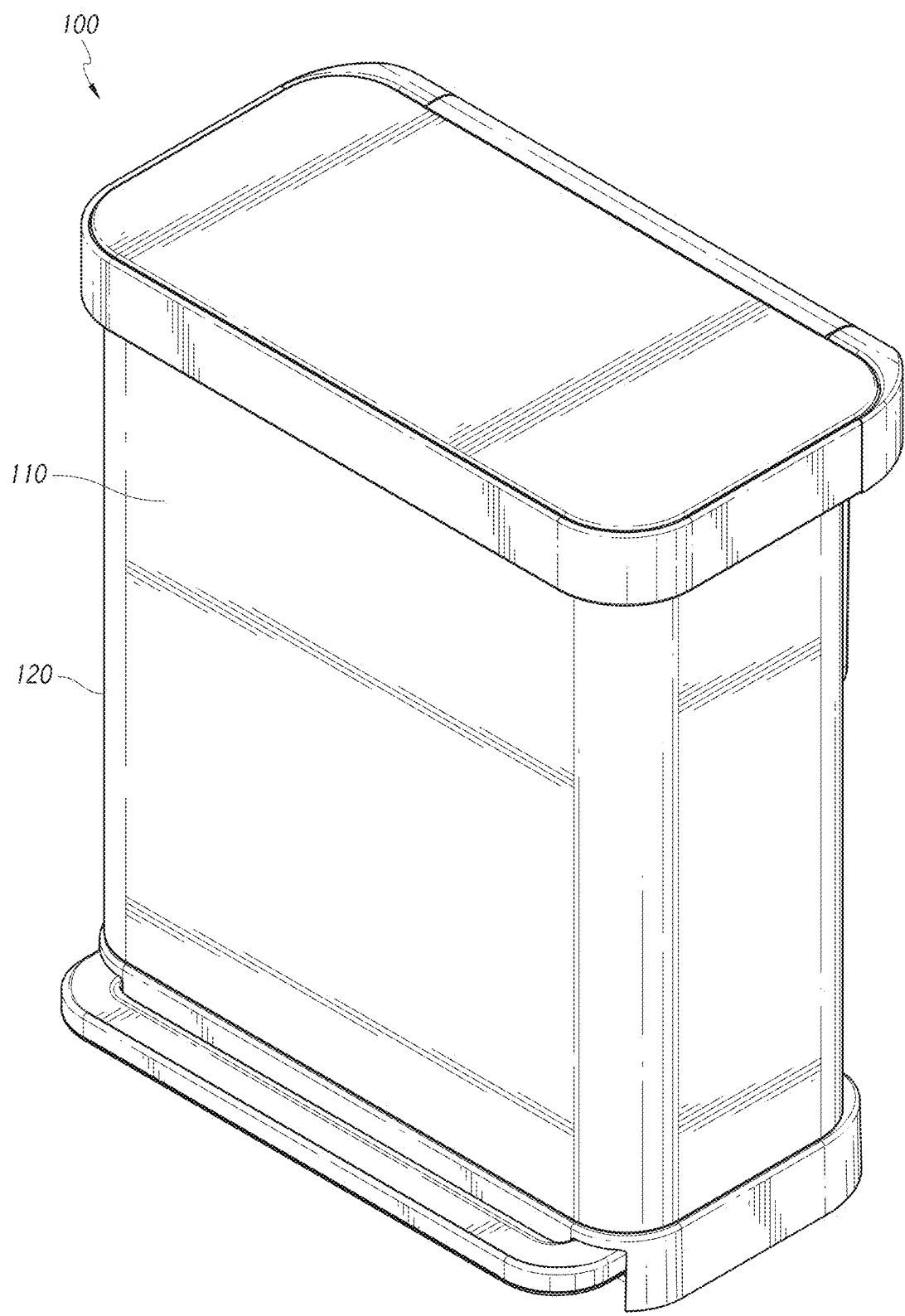
FIG. 1 illustrates a trashcan having an antimicrobial coating.
Figure 2:
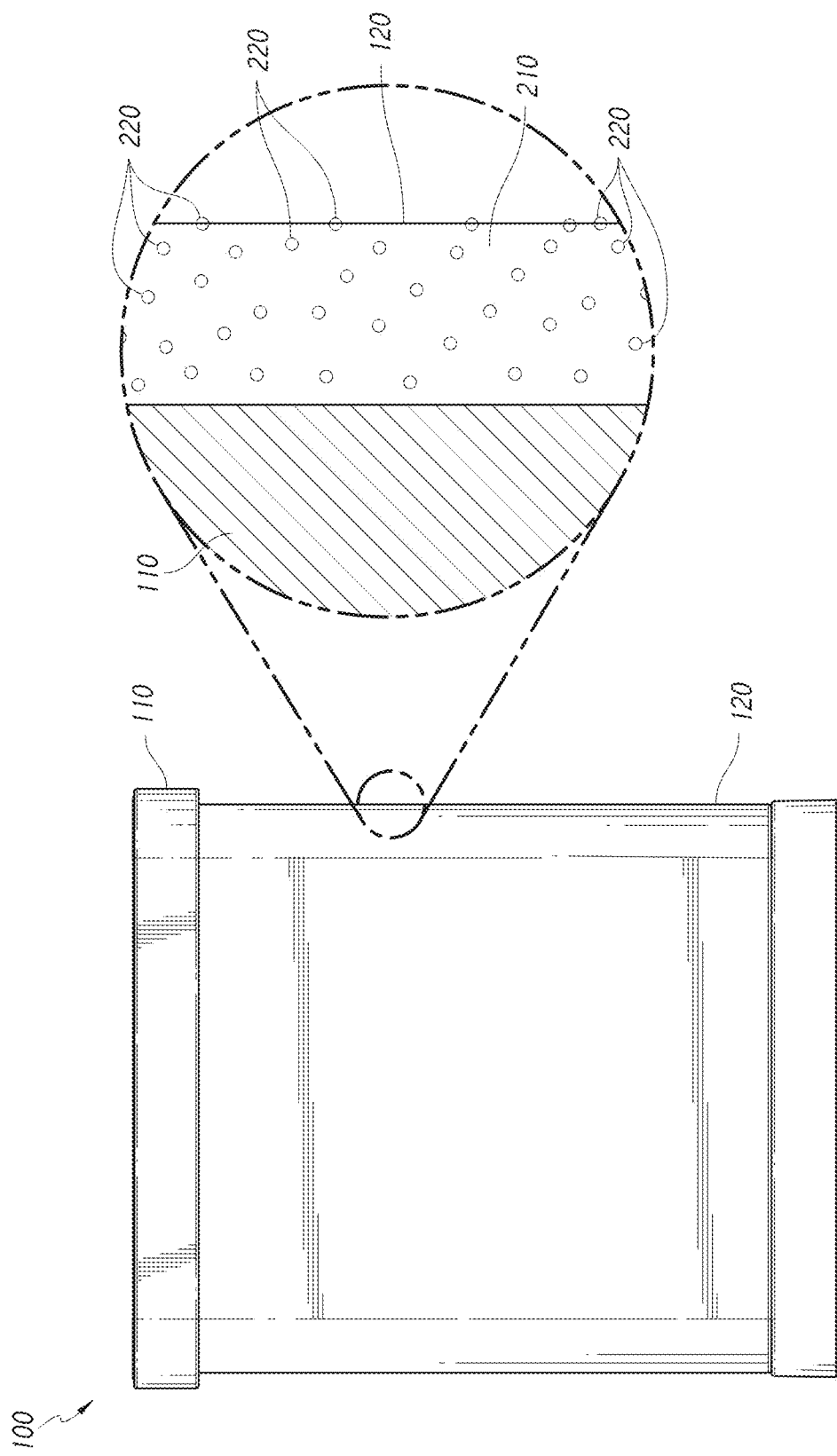
FIG. 2 is front view of the trashcan of the FIG. 1 and a close-up, cross-sectional view of a portion of the trashcan.

As shown in FIGS. 1 and 2, certain embodiments are disclosed herein in the context of a coating 120 for a trashcan 100 comprising sheet metal 110, as the coating may have particular utility in this context. However, the various aspects of the present disclosure can be used on sheet goods generally and for other household goods having metal or non-metal components. For example, some illustrative household goods are: soap dispensers, mirrors (e.g. metal trim on mirrors, stands, etc.), soap dishes, grocery bag dispensers, shower/sink caddies, utensil holders, organizers (e.g., for drawers or countertops), paper towel holders, dishracks, wall mount liquid pumps (e.g., for soap, shampoo, etc.), toilet plunger handles, appliance handles (e.g., for microwaves, refrigerators, dishwashers, ovens, coffee makers, etc.), appliances (e.g., refrigerators, microwaves, dishwashers, ovens, blenders, coffee makers, trash compactors, BBQ grills, etc.), sink accessories (e.g., handles, faucets, etc.), liquid dispensers (e.g., for drinkables), washers, driers, components for the same, and the like. In some variants, the coating is applied to the handles, trim, or removable inner buckets of trashcans (e.g., removable inserts that fit within a larger trashcan body). In some embodiments, the coatings described herein can be applied to handheld devices or touchscreens.

In some embodiments, the household good is broadly a metal good. In some variants, the household good comprises stainless steel. In some embodiments, the metal of the household good comprises one or more of stainless steel, brass, copper, steel, aluminum, iron, platinum, gold, silver, zinc, other metals, metal alloys of the same, and the like. In certain embodiments, the household good is made of a nonmetal material (e.g., plastic, glass, etc.) and/or a composite material.

In certain variants, the coating is configured to adhere to one or more surfaces of the household good. In some implementations, the coating is applied to a material sheet surface used to make a household good. For example, as discussed in more detail below, the coating can be applied to a sheet of metal that is subsequently formed into a portion of the household good, such as the body and/or lid of a trashcan. In some variants, for example, the coating can be applied to the inside and outside surfaces of the household good (e.g., both sides of a stainless steel sheet used to prepare a trashcan). In certain variants, the coating is applied to only select surfaces of the household good. For example, in some implementations, the coating is applied only to the outside of the household good, (e.g., trashcan, etc.). In other variants, the coating is applied only to the inside of the household good (e.g., trashcan, etc.). In some embodiments, the coating is applied to one or more of the inside, outside, lid, handle, or pedal of the household good (e.g., trashcan, etc.).

Figures 3A, 3B:
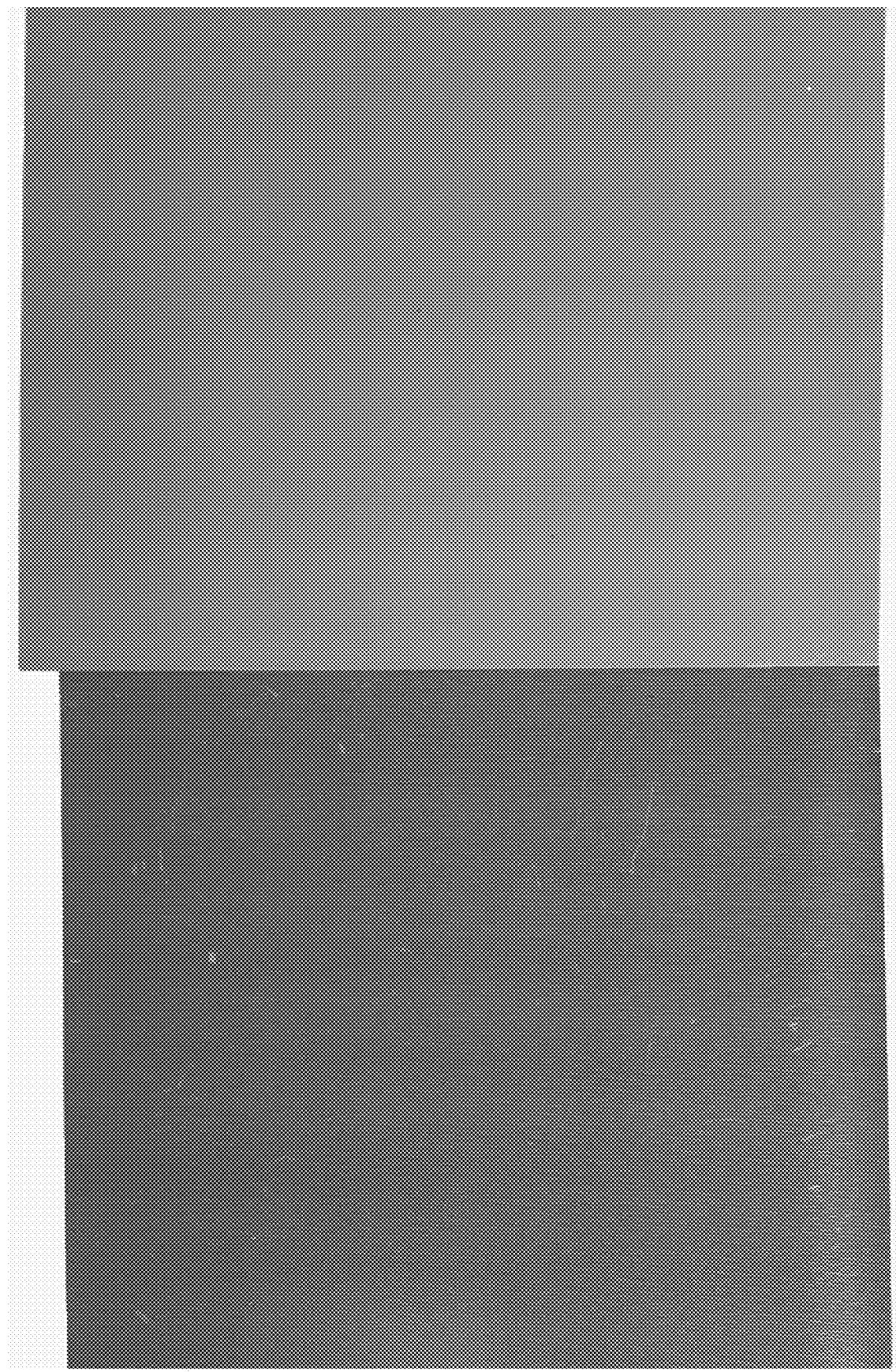
FIGS. 3A-B are photographs of sheets of material comprising one or more coatings containing an antimicrobial agent.
Figure 4B:
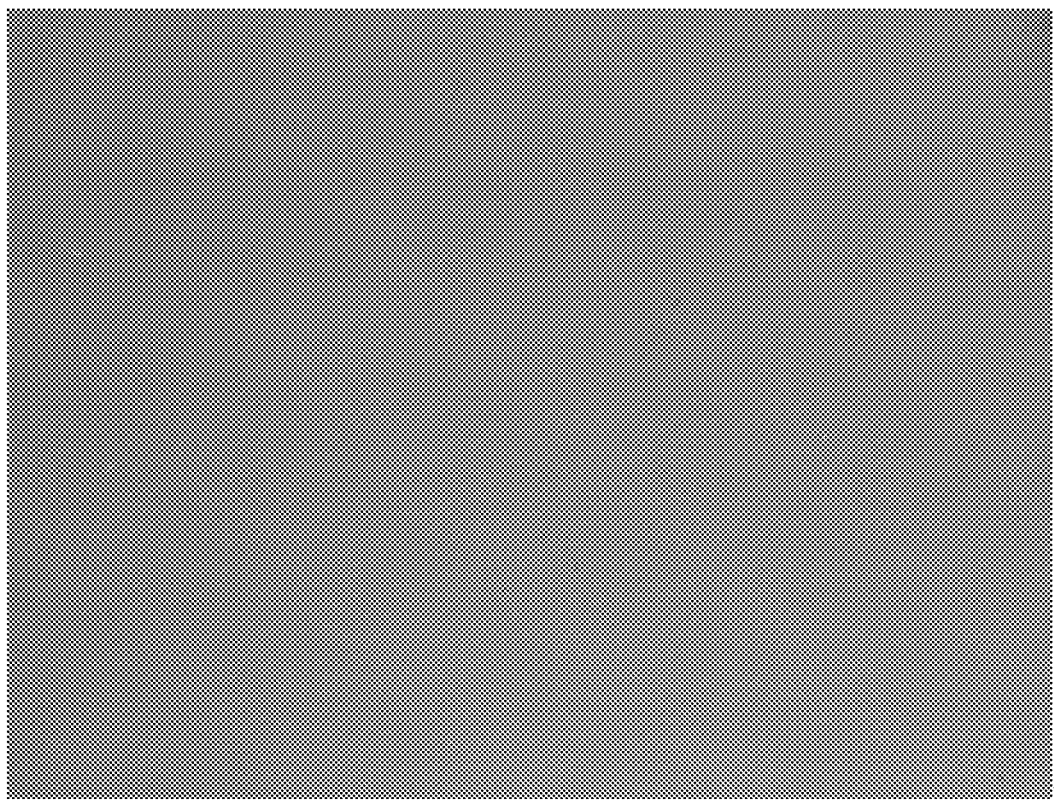
FIGS. 4A-B are close-up views of portions of the photographs of FIGS. 3A-B.
Figure 4A:
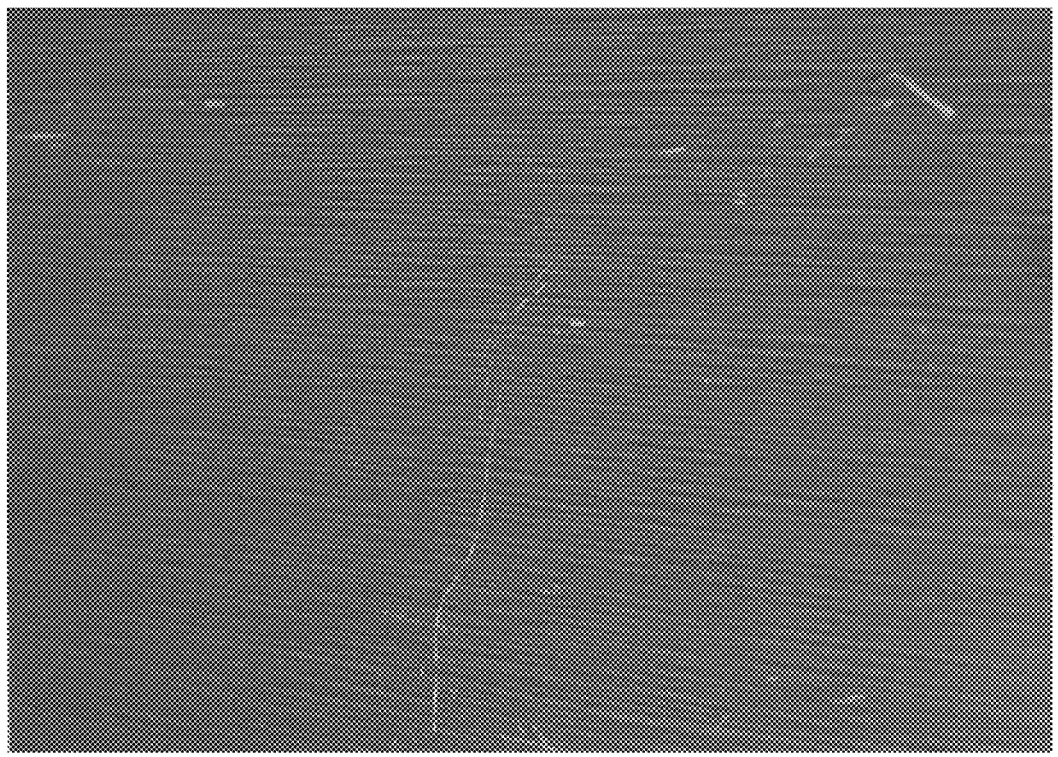

In some variants, the coatings and methods of coating materials described herein increase and/or maximize antimicrobial effects of an antimicrobial agent in the coating without substantially affecting the appearance of the household good. For example, in some embodiments, the antimicrobial coating is smooth and uniform without visible streaking and/or is clear (or substantially clear). In some embodiments, the antimicrobial coating is substantially smooth and/or substantially uniform and/or substantially even or consistent in reflectivity across a particular surface of the coating or a particular portion of a surface of the coating, without substantial visible streaking and/or is clear (or substantially clear). FIGS. 3A-B and 4A-B shows side-by-side examples of an antimicrobial coating that are streaked or smooth and uniform without visible streaking. For instance, the coatings of FIGS. 3B and 4B are substantially streak-free, while those of FIGS. 3A and 4A are not. In certain implementations, the antimicrobial coating shows unobstructed views of the surfaces underneath the coating, such as the top of the surface to which the coating is applied. In certain implementations, the coating is colorless or substantially colorless. In some implementations, the coating has a blue tint.

In certain implementations, the coating is generally planar and/or substantially flat. In some embodiments, the coating is substantially uniform and/or smooth. In some variants, the coating is generally contiguous. In some embodiments, the aforementioned properties of the coating make it appear substantially streak-free where streaks are not generally visible upon casual visual observation.

Certain Substrates

In certain implementations, as disclosed above, the coating comprises a substrate and one or more antimicrobial agents. In certain implementations, the antimicrobial is dispersed under, within (e.g., homogenously throughout the substrate or as a gradient), or on the substrate (e.g., adhered and/or functionalized to the substrate surface). In some embodiments, the substrate is any material that provides a support for the antimicrobial agent while allowing access to the antimicrobial agent by bacteria or other microbes that come into contact with the coating. In some implementations, the substrate is substantially clear (e.g., selected to be substantially optically transparent to the naked eye).

In certain implementations, the substrate comprises a polymeric material. For example, the substrate can comprise polyethylene. In some variants, the substrate comprises a mixture of more than one polymeric material.

While polymeric substrates are described here, any other matrices could be used, keeping in mind that the goal of the substrate (i.e., the matrix, the support, etc.) is, in some embodiments, to provide a material that is capable of supporting an antimicrobial agent while adhering to a household good in a manner that does not substantially distort the appearance of that good. For example, in some embodiments, the substrate comprises a crosslinkable polymer matrix or copolymer matrix.

In some embodiments, the substrate itself is formulated using one or more polymers that themselves have antimicrobial effects. For example, in certain implementations, the substrate comprises a polymeric material comprising one or more polymeric antimicrobial materials, such as polyethyleneimine, NIPAM, or other cationic or polycationic polymers.

Certain Antimicrobial Agents

Some embodiments pertain to an antimicrobial agent bound to a surface (e.g., a metal portion) of a household good. In some embodiments, the antimicrobial is adhered to the surface of a household good via a substrate as described elsewhere herein. In some embodiments, the substrate and antimicrobial agent form a coating. In certain embodiments, the antimicrobial agent itself provides a coating and/or is the coating on the household good. In certain implementations, as described above and as shown in FIG. 2, the coating comprises an antimicrobial agent 220 dispersed within a substrate 210. In certain implementations, as shown in the expanded cross-sectional view of FIG. 2, at least a portion of the antimicrobial agent 220 is exposed on the outside surface of the coating 120. In some variants, the antimicrobial agent 220 is able to directly contact microbes that are on the surface of the coating 120 because the antimicrobial agent 220 escapes and/or protrudes from (e.g., is sticking out of) the substrate 210. In some embodiments, the antimicrobial agent can diffuse over time to the surface of the coating to interact directly with microbes on the surface of the household good.

In some embodiments, the antimicrobial agent comprises an antimicrobial zeolite. In some embodiments, the antimicrobial zeolite comprises one or more antimicrobial metal ions, antimicrobial metals, or antimicrobial organic ions. In some embodiments, the antimicrobial agent and/or antimicrobial zeolite comprises water. For instance, in some embodiments, where the antimicrobial agent comprises a zeolite, some portion of water can be trapped in or adhered to the zeolite. In some embodiments, the antimicrobial zeolite or antimicrobial agent comprises one or more of ionic silver, ionic copper or copper metal, or ammonium. In some embodiments, the antimicrobial zeolite and/or the antimicrobial agent comprises each of silver ions, copper (ionic or metallic), and ammonium. In some embodiments, the antimicrobial agent comprises AGION®, available from Sciessent LLC of Wakefield, Mass. In some embodiments, the weight percent of zeolite (e.g., an aluminosilicate portion of the zeolite without water, antimicrobial anions, or antimicrobial organic cations) in the antimicrobial zeolite and/or the antimicrobial agent is equal to or greater than about 68% and/or less than or equal to about 94%. In some embodiments, the weight percent of zeolite in the antimicrobial agent and/or antimicrobial zeolite is equal to or at least: about 60%, about 65%, about 70%, about 80%, about 90%, about 95%, about 99%, values between the aforementioned values, ranges spanning those values, or otherwise. In some embodiments, the weight percent of zeolite in the antimicrobial agent and/or antimicrobial zeolite is less than or equal to: about 99%, about 95%, about 90%, about 85%, about 80%, about 75%, about 70%, about 65%, about 60%, values between the aforementioned values, ranges spanning those values, or otherwise. In some embodiments, the antimicrobial agent comprises one or more antimicrobial zeolites and/or other antimicrobial entities (e.g., silver ions, ionic copper, ammonium, etc.).

In some embodiments, ionic silver can be present in an amount equal to or greater than about 2% and/or less than or equal to about 5% by weight of the antimicrobial zeolite and/or by weight of the antimicrobial agent. In some embodiments, the weight percent of ionic silver in the antimicrobial zeolite (and/or in the antimicrobial agent) is equal to or greater than at least: about 0.5%, about 1.0%, about 2.0%, about 3.0%, about 4.0%, about 5.0%, about 6.0%, about 7.0%, about 8.0%, about 9.0%, about 10.0%, values between the aforementioned values, ranges spanning those values, or otherwise. In some embodiments, the weight percent of ionic silver in the antimicrobial zeolite (and/or in the antimicrobial agent) is less than or equal to: about 0.5%, about 1.0%, about 2.0%, about 3.0%, about 4.0%, about 5.0%, about 6.0%, about 7.0%, about 8.0%, about 9.0%, about 10.0%, values between the aforementioned values, ranges spanning those values, or otherwise.

In some variants, ionic copper or copper metal can be present in an amount equal to or greater than about 4% and/or less than or equal to about 7% by weight of the antimicrobial zeolite (and/or by weight of the antimicrobial agent). In some embodiments, the weight percent of ionic copper or copper metal in the antimicrobial zeolite (and/or in the antimicrobial agent) is equal to or at least: about 0.5%, about 1.0%, about 2.0%, about 3.0%, about 4.0%, about 5.0%, about 6.0%, about 7.0%, about 8.0%, about 9.0%, about 10.0%, values between the aforementioned values, ranges spanning those values, or otherwise. In some embodiments, the weight percent of ionic copper or copper metal in the antimicrobial zeolite (and/or in the antimicrobial agent) is less than or equal to: about 0.5%, about 1.0%, about 2.0%, about 3.0%, about 4.0%, about 5.0%, about 6.0%, about 7.0%, about 8.0%, about 9.0%, about 10.0%, values between the aforementioned values, ranges spanning those values, or otherwise.

In various embodiments, ammonium can be present in an amount equal to or greater than about 0% and/or less than or equal to about 2% by weight of the antimicrobial zeolite (and/or in the antimicrobial agent). In some embodiments, the weight percent of ammonium in the antimicrobial zeolite (and/or in the antimicrobial agent) is equal to or at least: about 0.5%, about 1.0%, about 2.0%, about 3.0%, about 4.0%, about 5.0%, about 6.0%, about 7.0%, about 8.0%, about 9.0%, about 10.0%, values between the aforementioned values, ranges spanning those values, or otherwise. In some embodiments, weight percent of ammonium in the antimicrobial zeolite (and/or in the antimicrobial agent) is less than or equal to: about 0.5%, about 1.0%, about 2.0%, about 3.0%, about 4.0%, about 5.0%, about 6.0%, about 7.0%, about 8.0%, about 9.0%, about 10.0%, values between the aforementioned values, ranges spanning those values, or otherwise.

In some embodiments, the antimicrobial agent comprises water. For instance, zeolites can also be hygroscopic and can naturally absorb water from the environment. In some embodiments, water can be present in an amount equal to or greater than about 0% to less than or equal to about 18% by weight of the antimicrobial zeolite (and/or of the antimicrobial agent). In some embodiments, the weight percent of water in the antimicrobial zeolite (and/or the antimicrobial agent) is equal to or at least: about 0.5%, about 1.0%, about 2.0%, about 3.0%, about 4.0%, about 5.0%, about 6.0%, about 7.0%, about 8.0%, about 9.0%, about 10.0%, about 15.0%, about 20.0%, values between the aforementioned values, ranges spanning those values, or otherwise. In some embodiments, the weight percent of water in the antimicrobial zeolite (and/or in the antimicrobial agent) is less than or equal to: about 0.5%, about 1.0%, about 2.0%, about 3.0%, about 4.0%, about 5.0%, about 6.0%, about 7.0%, about 8.0%, about 9.0%, about 10.0%, about 15.0%, about 20.0%, values between the aforementioned values, ranges spanning those values, or otherwise. In certain implementations, the antimicrobial zeolite comprises about 18% water by weight ("AC10N"), about 5% water by weight ("AC10D"), or about 2% water by weight ("AC10H").

In some embodiments, one or more antimicrobial agents are supported by a sub-support structure that, by itself, may or may not be antimicrobial. For instance, in some embodiments, one or more antimicrobial agents are supported on a nanoparticle (e.g., a particle with an average particle sizes ranging from equal to or greater than about 10 nm to less than or equal to about 1000 nm) or microparticle (e.g., a particle with an average particle sizes ranging from equal to or greater than about 1 μm to less than or equal to about 1000 μm). In some embodiments, the sub-support comprises a zeolite. In some embodiments, the sub-support structure can comprise any one of ionic silver, ionic copper, ammonium, and/or water in any of the weight percentages described elsewhere herein. In some embodiments, as described above, the antimicrobial agent comprises a zeolite sub-support with one or more antimicrobial ions adhered to it (or diffused within it). In some embodiments, the average particle size of the zeolite (or other sub-support structure) is equal to or less than: about 100 μm, about 10 μm, about 1 μm, values ranging between the aforementioned values, values between the aforementioned values or otherwise. In some embodiments, the average particle size of the zeolites (and/or other sub-support structure) is less than about 6 μm.

In some variants, the antimicrobial agent lacks a zeolite (e.g., a zeolite sub-support structure) or other sub-support structure and instead comprises one or more of free silver (e.g., silver ions, a silver salt, metallic, etc.), copper (copper ions, a copper salt, or metallic copper, etc.), organosilanes, ammonium, or cationic materials (e.g., 3-(trimethoxysilyl)-propyldimethyloctadecyl ammonium chloride, etc.) that provide antimicrobial effect. For instance, in some embodiments, the coating comprises silver ions.

In some embodiments, the substrate that supports the antimicrobial agent comprises the bulk dry weight of the coating. In some embodiments, the antimicrobial agent makes up equal to or less than about 1.25 wt % (i.e., weight percent) of the total coating weight. In some embodiments, the coating comprises equal to or greater than about 0.1% and/or less than or equal to about 1.5% antimicrobial agent by weight. In some embodiments, the coating comprises equal to or greater than about 1.1% and/or less than or equal to about 1.3% antimicrobial agent by weight. In some embodiments, the coating comprises equal to or greater than about 1.1% and/or less than or equal to about 1.2% antimicrobial agent by weight. In some embodiments, the weight percent of antimicrobial agent in the coating is at least: about 0.0001%, about 0.001%, about 0.01%, about 0.1%, about 0.5%, about 1.0%, about 1.25, about 1.5%, about 2.0%, values between the aforementioned values, values greater than the aforementioned values, values less than the aforementioned, or otherwise. In some embodiments, the weight percent of the antimicrobial agent in the sub-support is less than or equal to: about 0.0001%, about 0.001%, about 0.01%, about 0.1%, about 0.5%, about 1.0%, about 1.25, about 1.5%, about 2.0%, values between the aforementioned values, ranges spanning those values, or otherwise.

Figure 5:
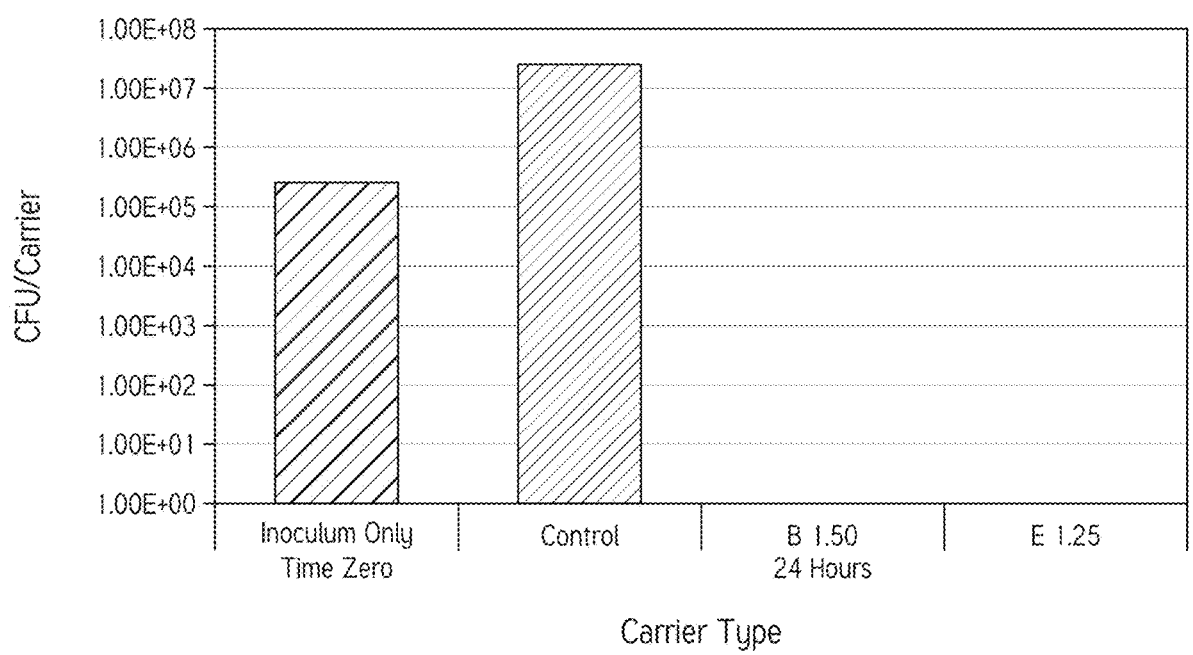
FIG. 5 is a graph showing *Escherichia coli* growth on uncoated versus coated metal sheets.
Figure 6:
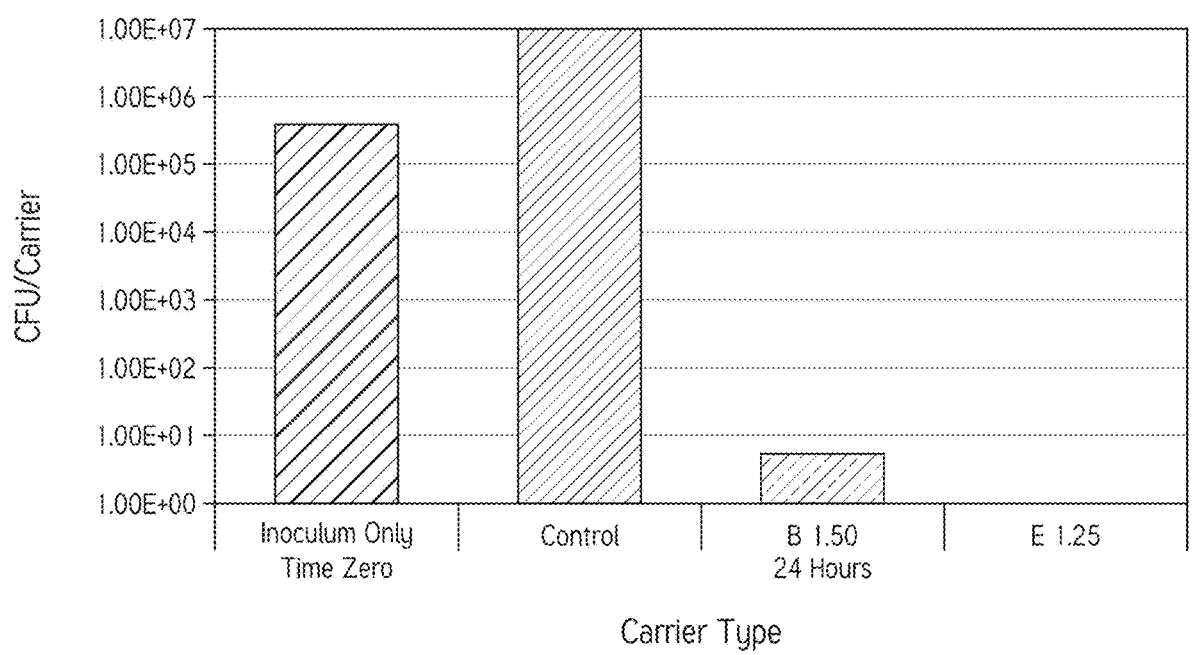
FIG. 6 is a graph showing *Staphylococcus aureus* growth on uncoated versus coated metal sheets.

As described below in Examples 2 and 3, and as shown in FIGS. 5 and 6, the antimicrobial coating kills substantially all of the bacteria present on the coating after a period of about 24 hours of exposure to the coating. As shown in the *Escherichia coli* (*E. coli*) results from Example 2 (and FIG. 5), both coatings comprising about 1.25 wt % AGION® or about 1.5 wt % AGION® kill substantially all of the *E. coli* present on the coating after a period of about 24 hours of exposure to the coating. As shown in the *Staphylococcus aureus* ("*S. aureus*") results from Example 2 (and as shown in FIG. 6), the coating comprising about 1.25 wt % AGION® kills this form of bacteria slightly more effectively than the about 1.5 wt % AGION® coating after a period of about 24 hours of exposure to the coating. This result surprisingly shows that a lower amount of AGION® can be used to achieve a nearly 100% kill rate relatively to larger doses. Without being bound to any particular mechanism, it is thought that the lower dose of AGION® (e.g., 1.25 wt % or less) allows it to be better distributed within the coating layer (e.g., by preventing aggregation) giving it a more efficient and effective antibacterial effect.

In embodiments, where the antimicrobial agent is provided without a sub-support structure (e.g., free of the zeolite), the weight % of antimicrobial agent in the coating can be reduced to account for the lack of this sub-support.

In some embodiments, about 24 hours after bacterial exposure on the coating, an amount of bacteria remaining on the coating is reduced by equal to or at least about 95% to about 100%. In some embodiments, 24 hours after bacterial exposure on the antibacterial coating, the amount of bacteria present is reduced by equal to or at least: about 75%, about 85%, about 95%, about 98%, about 99%, about 99.9%, about 99.99%, about 99.999%, about 99.9999%, or about 99.99999%. In some embodiments, the coating reduces the amount of *E. coli* from about $2.3 \times 10^5$ CFU/carrier to about 0 CFU/carrier and/or less than or equal to about 5 CFU/carrier (with a limit of detection of about 5 CFU/carrier) over a period of about 24 hours. In some embodiments, as shown in Table 1, relative to a control, the coating reduces the amount of bacteria from about $2.35 \times 10^7$ colony forming units (CFU)/carrier (on a control surface) to about 0 CFU/carrier and/or less than or equal to about 5 CFU/carrier (with a limit of detection of about 5 CFU/carrier) over a period of about 24 hours. In some embodiments, the coating reduces the amount of *S. aureus* from about $3.85 \times 10^5$ CFU/carrier to about 0 CFU/carrier and/or less than or equal to about 5 CFU/carrier (with a limit of detection of about 5 CFU/carrier) over a period of about 24 hours. In some embodiments, as shown in Table 2, relative to a control, the coating reduces the amount of bacteria from about $9.5 \times 10^6$ colony forming units (CFU)/carrier (on a control surface) to about 0 CFU/carrier and/or less than or equal to about 5 CFU/carrier (with a limit of detection of about 5 CFU/carrier) over a period of about 24 hours. In some embodiments, the coating has the above described antimicrobial effects on one or more bacteria selected from *Streptococcus pneumoniae, Haemophilus influenzae, Moraxella catarrhalis, S. aureus, E. coli*, or the like. In some embodiments, the coating has antimicrobial effects on gram positive and/or gram negative bacteria.

Features of Certain Antimicrobial Coatings

As described above, the antimicrobial coating can be applied to household goods. In some embodiments, the coating is sufficiently durable for long-term use (e.g., is able to maintain integrity and substantially unreduced efficacy over a period of at least one year with regular and normal usage). In some variants, the look of the household good remains substantially unchanged and/or the antimicrobial properties remain substantially unchanged during long term use (e.g., for periods of one, two, three, four or more years as could be measured over time or with accelerated stress conditions).

In some embodiments, the coating is sufficiently durable to withstand repeated cleanings or washings. For instance, because household goods such as trashcans and sink accessories are typically washed repeatedly over their lifetimes, in certain variants, the coating is configured to maintain its antimicrobial properties after repeated cleanings that include scrubbing and washing with soapy water. In some embodiments, a durable coating maintains its antimicrobial properties after at least about 25, at least about 50, at least about 100, or more washes with a standard wash cloth and soapy water. In certain variants, the coating maintains its antimicrobial activity after at least about 25, at least about 50, at least about 100, or more washes with a paper towel and a household cleaner (e.g., bleach, an ammonia-based cleaner (e.g., WINDEX® cleaner), etc.).

In some variants, the coating maintains its antimicrobial properties under accelerated wear conditions (e.g., under heat stress, increased humidity, exposure simulated sunlight, etc.) intended to simulate the lifetime of the good. In some embodiments, the coating maintains its antimicrobial properties after being abraded (e.g., abrasions or scratches caused by steel wool or other abrading agents). In some variants, the coating maintains its antimicrobial properties after about 1000 wipes using a dry kimwipe. In some embodiments, a product that maintains its antimicrobial properties includes products that retain at least about 75%, at least about 85%, at least about 90%, at least about 95%, at least about 99%, or more of its initial antimicrobial property before use.

In some embodiments, the durability of the coating can be measured using the contact angle of a droplet of water or oil on the coating surface. In certain variants, the contact angle of a droplet of water on the coating changes less than about 10% under one or more of the washing and wear conditions described above. In some embodiments, the contact angle of a droplet of water on the coating changes less than about 20% and/or less than about 40% under one or more of the washing and wear conditions described above. In some embodiments, the contact angle of a droplet of oil on the coating changes less than about 10% under one or more of the washing and wear conditions described above. In some embodiments, the contact angle of a droplet of oil on the coating changes less than about 20% or less than about 40% under one or more of the washing and wear conditions described above.

In some embodiments, the coating maintains its antimicrobial activity even after polishing and/or drawing. Polishing can include abrasion with a cloth and a polishing agent under typical polishing conditions. In certain implementations, the coatings provided herein advantageously protect the appearance of metal goods, making polishing of the surfaces of the household good unnecessary. In some embodiments, this property can advantageously give products even longer lasting antimicrobial properties.

In some embodiments, the antimicrobial properties of the coatings are accomplished without leaching of copper from the coating. In some embodiments, the antimicrobial properties of the coatings are accomplished without leaching of silver from the coating. In some embodiments, the antimicrobial properties of the coatings are accomplished without leaching of copper and/or ammonium from the coating.

In some embodiments, the coating is fingerprint or smudge resistant. The terms "fingerprint resistant," or "smudge resistant" refer to the ability of a surface to resist the visible transfer of residue from physical interactions with a user, the minimization, hiding, or obscuring of tactilely-transferable residue on a surface, and/or combinations thereof. In certain implementations, a fingerprint-resistant surface is substantially resistant to both water-based material and oil-based material transfer when contacted by a user. In some embodiments, a fingerprint-resistant surface is substantially resistant to one or more of inorganic-based material and organic-based material transfer when contacted by a user. In some embodiments, fingerprint resistance is measured using the amount of transferred residue after a user makes physical contact with the household good. For instance, after physical contact (e.g., from the skin of a user), some amount of residue can transfer to the household good. The mass of the residue on the coated household good after each interaction can be quantified, for example, by weighing the mass (or by weighing the mass of a representative test sheet of that material). In some embodiments, the mass transferred from a user to the coated household good is less than or equal to: about 1 mg, about 0.02 mg, or 0.001 mg per instance of physical contact (for instance by dragging a hand across the test surface) to a portion of the household good that is sized 4"×4". In some embodiments, the fingerprint resistance is qualitatively measured using the human eye and a fingerprint/smudge resistant material shows less visible residue after physical contact than a non-resistant surface. In some embodiments, the fingerprint resistance of a material is measured by determining the reflectivity before contact (e.g., when clean) or after one or more instances of physical contact (as described above). In some implementations, when the fingerprint resistant material is coated on a mirrored-surface (or a chromed-surface, stainless steel, or another otherwise reflective surface of a household good), the fingerprint resistant material maintains at least about 75%, at least about 95%, or at least about 99% of the reflectance of the surface compared to that before an instance of physical contact. In some embodiments, coatings that are fingerprint or smudge resistant are advantageously more desirable to consumers for aesthetic reasons.

In certain implementations, the antimicrobial agent is deposited directly into a fingerprint mitigating (fingerprint resistant) material to form the coating material and the two are added to any surface of the household good together. In some embodiments, the fingerprint resistant material (e.g., compound) is applied separately (before or after) the antimicrobial compound. In some embodiments, antimicrobial coatings and fingerprint resisting coatings are added as separate layers that can be sandwiched on top of one another. A plurality of layers can be added by exposing sheets of, for example, metal to antimicrobial coating and fingerprint proof coating conditions repetitively. In certain implementations, the antimicrobial agent and the fingerprint resistant material are added in patterns on a surface (e.g., patches, stripes, etc.) that give the household good both antimicrobial and fingerprint resistant properties on substantially the entire coated surface.

Certain Methods Related to the Antimicrobial Coating

Figure 7:
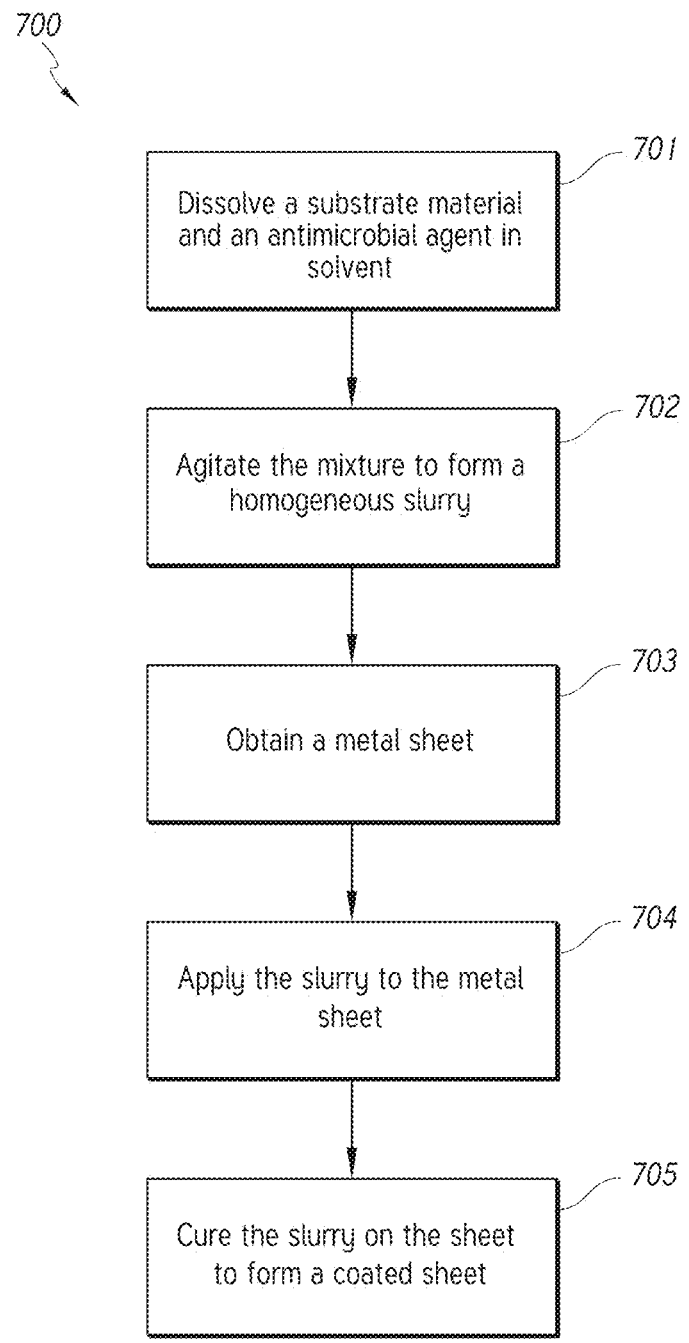
FIG. 7 is a flow chart showing a process of preparing an antimicrobial coating on a metal sheet.

Some embodiments pertain to methods of preparing a coated household good. A flow chart describing an embodiment of a method 700 is provided in FIG. 7. As shown, in certain variants, the antimicrobial agent is dispersed within a solution, such as a solution of polymer and solvent 701.

This mixture is agitated to form a substantially uniform slurry 702. After the slurry is formed, a sheet of material is obtained 703 and the slurry it is layered onto a sheet of material to form a coated sheet 704. For example, the slurry can be applied to a sheet of metal, such as stainless steel 704. In some embodiments, the sheet can be cured for a period of time to afford a coated sheet 705. In certain implementations, the dried coated sheet can then be cut and shaped in appropriate ways to form walls, lids, foot pedals, and handles for metal household goods including trashcans.

In some embodiments, prior to application to the sheet, the antimicrobial agent is slurried with the polymer in a solvent to form a mixture. In some variants, the slurry is agitated continuously prior to application to the metal sheet in order to maintain a homogenous dispersion. In some embodiments, the dispersion is distributed into a coating device that spreads an even layer of the slurry onto the sheet. The solvent can then be evaporated from the slurry, leaving an antimicrobial surface on the sheet that comprises a smooth layer of polymer with the antimicrobial agent dispersed within it. In some embodiments, the evaporation of the solvent cures the polymer/antimicrobial agent. In certain implementations, after curing, at least a portion of the antimicrobial agent protrudes from the substrate and is available to directly interact with microbes on the surface of a coated household good. In some embodiments, the antimicrobial agent can diffuse over time to the surface of the coating to interact directly with microbes on the surface of the household good. In certain implementations, the antimicrobial agent is consumed during the killing of microbes, while in other embodiments it is not. In some embodiments, direct contact with the microbe and the antibacterial agent is not necessary.

It has been found that several coating techniques for surfaces are not amenable to distributing streak-free antimicrobial coatings. For instance, coatings applied using a metered-rolling process result in streaked coatings (see FIGS. 3A and 4A). In a metered-rolling process, a rolling element rolls in the direction of a sheet that passes over the rolling element. In a metered-rolling device, the rolling element is at least partially submerged in a reservoir of a coating agent. As the rolling element rolls, it draws coating agent from this reservoir and deposits it on a sheet as the sheet moves by. This process coats the sheet as the sheet travels along in the direction of rolling.

Figure 8:
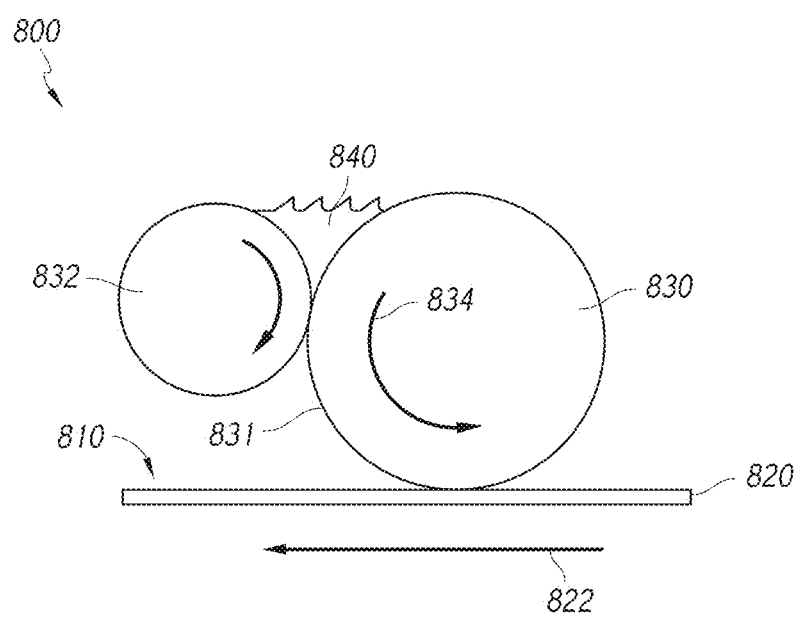
FIG. 8 illustrates diagram of a sheet being coated using a reverse-rolling process.

In contrast, in various embodiments described herein, the coating device uses a non-metered-rolling process (e.g., a reverse-rolling technique) to apply the slurry to the sheet. FIG. 8 shows an embodiment of a system 800 that can be used to apply a coating 810 by reverse-rolling. For instance, in certain variants, in the non-metered, reverse-rolling process, the metal sheet 820 is drawn below a first rolling element 830 (e.g., a coating roller) of the coating device in a first direction 822. The first rolling element 830 is in fluidic communication with a reservoir 840 containing a slurry of antimicrobial agent, polymer, and/or solvent that is formed between the first rolling element 830 and a second rolling element 832 (e.g., a doctor roll). The first rolling element 830 draws the slurried mixture from the reservoir 840 and deposits it on a surface of the first rolling element 831 which distributes the slurried mixture to the sheet as the sheet passes below the first rolling element 830. During reverse-rolling, the region of the first rolling element 830 that is approximately adjacent to the sheet 820 travels (e.g., rolls) in a second direction 834, which is opposite to the first direction 822 (the direction of movement of the sheet). In some implementations, when reverse-rolling is used, the final coating is substantially or completely streak-free to the unaided eye (see, e.g., FIGS. 3B and 4B).

Without being bound to any particular mechanism, it is believed that the antimicrobial agent adds contrast the coating. If applied using certain methods, the contrast of a coating having an antimicrobial agent, as disclosed herein, becomes large enough to be visible by the naked eye. In some embodiments, whether a coating is streak-free can be measured using the naked eye. In some implementations, whether a coating is streak-free can be quantified. In some embodiments, for instance, streak-free coatings are those having a transmittance variation between any two points on the surface that varies by less than: about 75%, about 50%, about 30%, about 20%, about 10%, about 5%, about 2%, or about 1% transmittance. In some embodiments, for instance, streak-free coatings are those having a reflectance variation between any two points on the surface that varies by less than: about 50%, about 25%, or about 5% reflectance. In certain implementations, the coating is applied using other solution-based techniques (e.g., spray coating, spin-coating, dip-coating, inkjetting, or the like) that result in streak-free materials.

In some embodiments, as the slurry cures, it forms a homogeneous distribution of antimicrobial agent within the coating. In some embodiments, a gradient of antimicrobial agent can be formed in the coating by, for example, depositing additional layers of slurry (with different concentrations of antimicrobial agent) onto the sheet. In some embodiments, a gradient can be formed by changing the curing rate (e.g., by slowing or increasing the curing speed using lower or higher cure temperatures etc.). In some embodiments, a gradient can be formed by depositing additional layers of higher or lower concentration slurry over partially cured other layers of slurry. In some embodiments, a gradient can be formed by changing the concentration of antimicrobial agent and/or polymer in solution. For example, in certain implementations, in more dilute solutions, the cure rate can be slowed so that more of the antimicrobial agent can settle in the direction of gravity during the curing process, forming a more concentrated layer in that direction. Any of the methods described in this specification can be used to form antimicrobial agent gradients that are either more concentrated at the surface of the coating or more concentrated at the surface of the household good (which can be especially useful in applications where, for example, the antimicrobial diffuses towards the surface of the coating over time). In some variants, gradients can be used to advantageously maintain or increase antimicrobial effect over time.

In some embodiments, uneven application of coatings to surfaces is reduced or minimized using the disclosed methods and/or substantially even (or uniform) coatings result. In certain implementations, visible streaking in the coating can be caused by the uneven application of the coating to the surface of the trashcan. In certain implementations, the methods used to deposit the coating result in a substantially uniform coating thickness on the sheet material. In certain implementations, the thickness of the coating can be equal to or greater than about 10 µm and/or less than or equal to about 20 µm. In some embodiments, the thickness can be less than or equal to: about 100 µm, about 80 µm, about 70 µm, about 60 µm, about 50 µm, about 40 µm about 30 µm, about 20 µm, about 10 µm, about 5 µm, values between the aforementioned values, ranges spanning those values, or otherwise. In some embodiments, the coating is of substantially uniform thickness. In some embodiments, the thickness of the coating varies by less than or equal to: about 100%, about 90%, about 80%, about 70%, about 60%, about 50%, about 40%, about 30%, about 20%, about 10%, about 5%, about 2%, values between the aforementioned values, ranges spanning those values, or otherwise as measured between any two points on a coated surface. In some embodiments, this level of uniformity results in a coating that appears substantially streak-free. In some embodiments, the coating is generally planar, substantially flat, substantially smooth and uniform, and/or substantially contiguous, such that streaks are not generally visible upon casual visual observation.

In some embodiments, the methods described herein result in a material that is substantially optically transparent. For example, in certain implementations, the optical transmittance of the coating over the visible spectrum is at least: about 65%, about 75%, about 85%, about 95%, about 98%, values between the aforementioned values, ranges spanning those values, or otherwise.

Certain Protective Coverings

Figure 9:
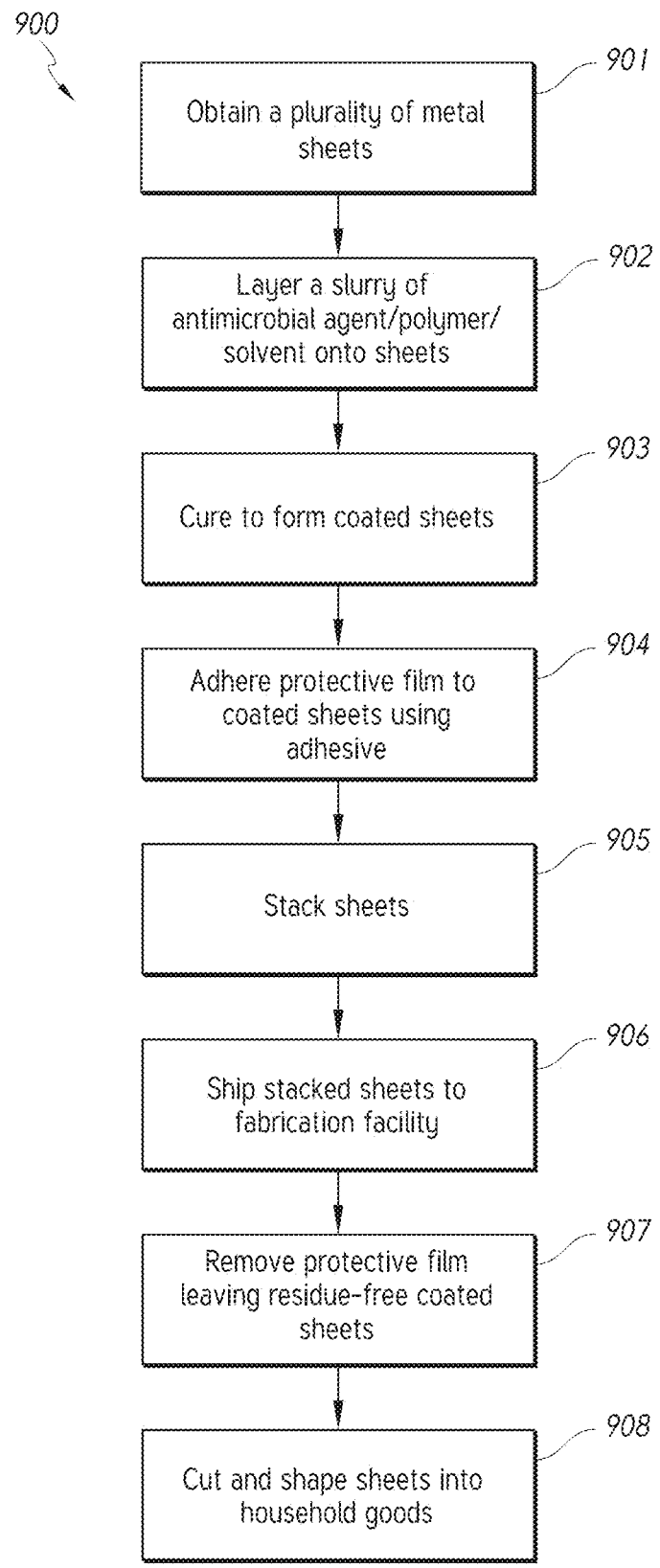
FIG. 9 is a flow chart showing a process of protecting an antimicrobial coating on a metal sheet.

Some embodiments pertain to protective coverings for the coatings disclosed herein. A flow chart describing an embodiment of a method 900 is provided in FIG. 9. As shown, in certain variants, a plurality of metal sheets is obtained 901. In some embodiments, sheets of a different material can be used (plastic, composite, etc.). A slurry of antimicrobial agent in a polymer/solvent solution is layered onto a plurality of metal sheets 902 which are then cured to form a coated sheets 903. A protective film is then adhered to the coated sheets using an adhesive 904. The sheets are then stacked 905 and transported to a fabricating facility 906. At the facility, the protective films and adhesive is removed without leaving residue from the adhesive on the coated sheet 907. The sheets are then cut and shaped to form household goods 908. In certain implementations, as described above, the dried coated sheet be cut and shaped in appropriate ways to form walls, lids, foot pedals, and handles for metal household goods including trashcans. In some implementations, finished goods can be protected by applying an adhesive and a protective film to antimicrobially coated household goods.

During shipping of sheets to make a household good or a household good itself, the surfaces of the sheet or sheet good can be protected by depositing films onto those surfaces. Rubber adhesives can be used to adhere protective films onto portions of the sheets or household goods. However, it has been found that some rubber adhesives leave deposits (e.g., residue, etc.) on the coatings (see FIG. 10A). This can result in streaks and other visual imperfections 1020 on the coating 1001 after the protective film 1010 is removed, as is pointed-to by the arrow in FIG. 10A. In certain instances, the residue can leave an unwanted sticky region on the coating. In certain instances, these residues cannot be readily washed away from the coatings.

Certain embodiments are configured to ameliorate at least one of these problems, or other problems. For example, some embodiments adhere or otherwise connect a protective film to a coated sheet of material such that removal of the film does not leave an appreciable residue on the coated material. In some embodiments, acrylic or silicone rubber adhesive is used to adhere the film to the coated sheet of material, which has been found to reduce or eliminate appreciable residue on the coating 1001 after removal of the film 1011 (see FIG. 10B which lacks residue). In certain implementations, the use of acrylic or silicone or rubber adhesive leads to a more visually appealing result once the protective film is removed. In some variants, the substantially complete removal of residue helps avoid areas (e.g., on top of the residue) where the antimicrobial activity of the coating could be blocked. In some embodiments, rubber may be used as an adhesive (with or without one or more other adhesives).

Some embodiments pertain to methods of applying protective films to antimicrobial coatings. In certain implementations, the adhesive is applied to a coated sheet of material using a solution-based technique (e.g., spray coating, spin-coating, dip-coating, inkjetting, rolling, or the like). Once applied, a protective film (e.g., a polymeric material) is deposited onto the adhesive, such as by rolling the film onto the coated sheet of material.

SUMMARY

Several illustrative embodiments of coatings and methods of coating have been disclosed. Although this disclosure has been described in terms of certain illustrative embodiments and uses, other embodiments and other uses, including embodiments and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various embodiments. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one embodiment, flowchart, or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and other implementations of the disclosed features are within the scope of this disclosure.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic.

Some embodiments have been described in connection with the accompanying drawings. Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in other implementations. Also, the separation of various components in the implementations described above should not be understood as requiring such separation in all implementations, and it should be understood that the described components and systems can generally be integrated together in a single product or packaged into multiple products. Additionally, other implementations are within the scope of this disclosure.

Conditional language used herein, such as, among others, "can," "could," "might," "may," "e.g.," and the like, unless specifically stated otherwise or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

In summary, various embodiments and examples of antimicrobial coatings and protective films have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims.

EXAMPLES

Example 1: Fabrication of Coated Metal

Coatings were prepared using a metered-rolling process and a reverse-rolling technique. Prior to coating, a slurry of polyethylene polymer and solvent was prepared. To this solution was added 1.25 wt % of AC10D grade AGION® (relative to the dry weight of polyethylene) forming a mixture. This mixture was stirred to achieve a uniform slurry. Once a uniform was achieved, it was added to the reservoir of a metered-rolling device which distributed the slurry on a stainless steel sheet via a roller rotating in the same direction of the sheet movement. The sheet was allowed to cure. FIGS. 3A and 4A show the resultant coated sheet.

A second slurry was formed using the same ingredients and techniques described above. This mixture was added to the reservoir of a reverse-rolling device which distributed the slurry on a stainless steel sheet via a roller rotating in the direction opposite the direction of the sheet. The sheet was allowed to cure. FIGS. 3B and 4B show the resultant coated sheet.

As shown in the figures, the reverse-rolling technique resulted in an antimicrobial coating that was streak-free and uniform relative to the antimicrobial coating formed using the metered-rolling technique.

Example 2: Antimicrobial Testing

Several experiments were performed using the Japanese Industrial Standard ("JIS") method Z 2801 antimicrobial evaluation method to show the antimicrobial activity of a sheet metal coated using the reverse-rolling process described in Example 1. The JIS method Z 2801 is a quantitative test designed to assess the performance of antimicrobial finishes on hard, non-porous surfaces. The method can be conducted using contact times ranging from ten minutes up to 24 hours. For a JIS Z 2801 test, non-antimicrobial control surfaces are used as the baseline for calculations of microbial reduction. The method can be used to determine the antimicrobial activity of a diverse array of surfaces including plastics, metals, and ceramics. The test microorganism(s) selected for this test were *Escherichia coli* 8739 (a Gram-negative bacteria) and *Staphylococcus aureus* 6538 (a Gram-positive bacteria).

Testing Method

The test microorganism was prepared by growth in a Tryptic Soy Broth. The suspension of test microorganism was standardized by dilution in a nutritive broth (this affords microorganisms the opportunity to proliferate during the test). Control and test substances were wiped clean with 70% ethanol and allowed to dry prior to testing. Control and test surfaces (50 mm×50 mm) were inoculated with microorganisms (where the testing parameter was 0.400 mL at a concentration of 4×10$^5$ CFU/Carrier), and then the microbial inoculum was covered with a thin, sterile film (40 mm×40 mm). Covering the inoculum spreads it, prevents it from evaporating, and ensures close contact with the antimicrobial surface. Microbial concentrations were determined at "time zero" by elution followed by dilution and plating to Tryptic Soy Agar. A control was run to verify that the neutralization/elution method effectively neutralizes the antimicrobial agent in the antimicrobial surface being tested. Inoculated, covered control and antimicrobial test surfaces were allowed to incubate undisturbed in a humid environment for 24 hours, at 36° C.±1° C. After incubation, microbial concentrations were determined. Reduction of microorganisms relative to the control surface were calculated. The neutralizer was D/E Broth (10 mL). The enumeration plate media was tryptic soy agar. The enumeration plate was incubated for 24±6 hours at 36° C.±1° C.

Results were calculated using the following formulae:

$$\text{Percent Reduction} = \left(\frac{B-A}{B}\right) \times 100$$

Where B=Number of viable test microorganisms on the control carriers after the contact time; and A=Number of viable test microorganisms on the test carriers after the contact time.

$$Log_{10} \text{ Reduction} = Log\left(\frac{B}{A}\right)$$

Where B=Number of viable test microorganisms on the control carriers after the contact time; and A=Number of viable test microorganisms on the test carriers after the contact time.

Results of *E. Coli* Testing

TABLE 1

| Test Microorganism | Contact Time | Carrier Type | CFU/Carrier | Percent Reduction Compared to Control at Contact Time | $Log_{10}$ Reduction Compared to Control at Contact Time |
|---|---|---|---|---|---|
| *E. coli* 8739 | Time Zero | Inoculum Only | 2.30E+05 | N/A | |
| | 24 Hours | Control | 2.35E+07 | | |
| | | B 1.50 | <5.00E+00 | >99.99998% | >6.67 |
| | | E 1.25 | <5.00E+00 | >99.99998% | >6.67 |

The data collected using *E. Coli* on 50 mm×50 mm carriers (covered by 40 mm×40 mm films) is shown in Table 1. FIG. 5 shows a graph plotting *E. Coli* CFU/Carrier against the control and experimental samples. The limit of detection for this study is 5 CFU/Carrier. Values less than the limit of detection are shown as <5.00 E+00 on the table and zero on the graph.

Results of *S. aureus* Testing

TABLE 2

| Test Microorganism | Contact Time | Carrier Type | CFU/Carrier | Percent Reduction Compared to Control at Contact Time | $Log_{10}$ Reduction Compared to Control at Contact Time |
|---|---|---|---|---|---|
| *S. aureus* 6538 | Time Zero | Inoculum Only | 3.85E+05 | N/A | |
| | 24 Hours | Control | 9.50E+06 | | |
| | | B 1.50 | 5.00E+00 | 99.99995% | 6.28 |
| | | E 1.25 | <5.00E+00 | >99.99995% | >6.28 |

The data collected using S. *Aureus* on 50 mm×50 mm carriers (covered by 40 mm×40 mm films) is shown in Table 2. FIG. 6 shows a graph plotting S. *Aureus* CFU/Carrier against the control and experimental samples. The limit of detection for this study is 5 CFU/Carrier. Values less than the limit of detection are shown as <5.00 E+00 on the table and zero on the graph.

Example 3: Antimicrobial Testing

Below are experiments performed using the Sciessent LLC antimicrobial evaluation methods to show the antimicrobial activity of a sheet metal (2"×2") coated using the reverse-rolling process described in Example 1. Certain samples were abraded before testing. The bacteria used were *E. coli* and *S. Aureus*.

TABLE 3

*E. Coli* (ATCC#: 25922) Testing

| | Organism Count (CFU/ml) | | |
|---|---|---|---|
| Sample Identification | Zero Contact Time | 24 Hours Contact Time | Percent Reduction** |
| Assay (+) | 2.5 × 10⁵ | 2.0 × 10⁷ | No Reduction |
| Assay (−) | <10* | <10* | N/A |
| Untreated coated metal samples Sciessent ID# 150811-1A | | 4.6 × 10⁷ | No Reduction |
| Coated metal samples (1.5% AC10D in coating) Sciessent ID# 150806-3B, Rep 1 | | 3.2 × 10⁴ | 99.93% |

TABLE 3-continued

E. Coli (ATCC#: 25922) Testing

| | Organism Count (CFU/ml) | | |
|---|---|---|---|
| Sample Identification | Zero Contact Time | 24 Hours Contact Time | Percent Reduction** |
| Coated metal samples (1.5% AC10D in coating) Sciessent ID# 150806-3B, Rep 2 | | $2.8 \times 10^4$ | 99.94% |
| Coated metal samples (1.5% AC10D in coating) - Abraded Sciessent ID# 150806-3B, Rep 1 | | $1.04 \times 10^3$ | 99.99% |
| Coated metal samples (1.5% AC10D in coating) - Abraded Sciessent ID# 150806-3B, Rep 2 | | $5.4 \times 10^2$ | 99.999% |

Testing was performed in accordance with standard operating procedures of Sciessent LLC.
*≤10 = Limits of Detection;
**is percent reduction calculated using: untreated T24 contact time.

TABLE 4

S. Aureus (ATCC#: 6538) Testing

| | Organism Count (CFU/ml) | | |
|---|---|---|---|
| Sample Identification | Zero Contact Time | 24 Hours Contact Time | Percent Reduction** |
| Assay (+) | $2.3 \times 10^5$ | $6.5 \times 10^6$ | No Reduction |
| Assay (−) | <10* | <10* | N/A |
| Untreated coated metal samples Sciessent ID# 150811-1A | | $5.0 \times 10^7$ | No Reduction |
| Coated metal samples (1.5% AC10D in coating) Sciessent ID# 150806-3B, Rep 1 | | $7.8 \times 10^4$ | 99.84% |
| Coated metal samples (1.5% AC10D in coating) Sciessent ID# 150806-3B, Rep 2 | | $5.9 \times 10^4$ | 99.90% |
| Coated metal samples (1.5% AC10D in coating) Sciessent ID# 150806-3B, Rep 3 | | $3.3 \times 10^4$ | 99.93% |
| Coated metal samples (1.5% AC10D in coating) - Abraded Sciessent ID# 150806-3B, Rep 1 | | $7.0 \times 10^1$ | 99.9999% |
| Coated metal samples (1.5% AC10D in coating) - Abraded Sciessent ID# 150806-3B, Rep 2 | | <10* | 99.9999% |
| Coated metal samples (1.5% AC10D in coating) - Abraded Sciessent ID# 150806-3B, Rep 3 | | <10* | 99.9999% |

Testing as performed in accordance with standard operating procedures of Sciessent LLC.
*≤10 = Limits of Detection;
**is percent reduction calculated using: untreated T24 contact time.

Example 4: Application of Protective Film to Coated Sheets

Protective film coatings were applied to a portion of sheet metal coated using the reverse-rolling process described in Example 1. In one experiment, to the coated sheet was sprayed a rubber adhesive (coinciding to FIG. 10A). In a second experiment, to the coated sheet was sprayed an acrylic and/or silicone rubber adhesive (coinciding to FIG. 10B). Soon after application of each adhesive, film protective layers were applied to the adhesives on the coated sheets. After 24 hours, the protective films were removed.

Figures 10A, 10B:
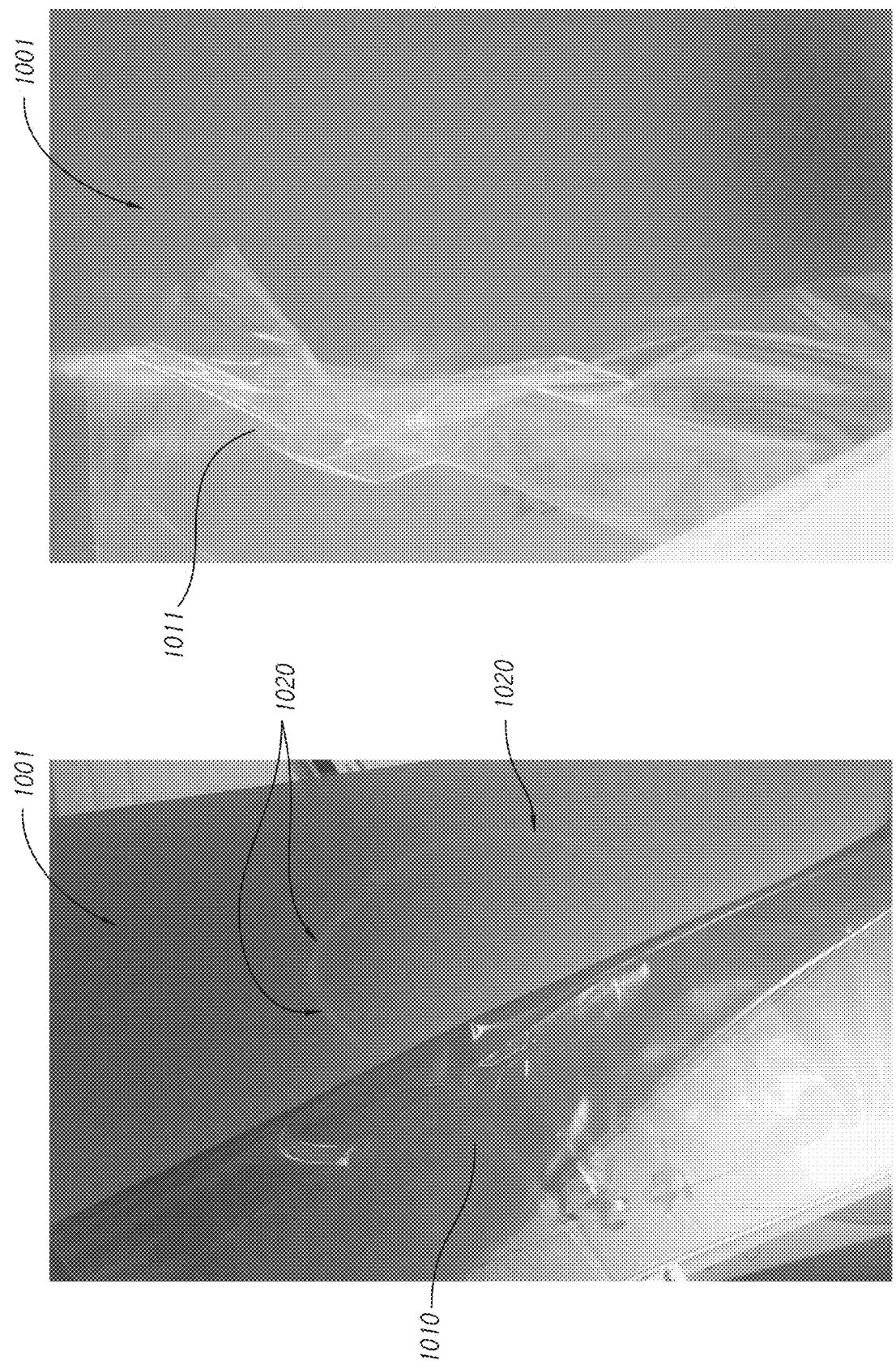
FIGS. 10A-B are photographs of partially removed protective films applied to sheets of material comprising coatings containing an antimicrobial agent.

After removal of the protective film, a residue was noted on the coated sheet where a rubber adhesive was used. The residue was washed several times with ethanol but remained on the coated surface (see FIG. 10A). No such residue was noted on the coated sheet where an acrylic and/or silicone rubber adhesive was used (FIG. 10B).

What is claimed is:

1. A trashcan comprising:
   a metal body shaped to provide at least a portion of a container that is configured to receive refuse;
   wherein a surface of the metal body comprises a coating deposited directly on the surface of the metal body, the coating comprising a substrate comprising polyethylene and an antimicrobial agent that is dispersed within the substrate;
   wherein the coating is applied directly to a metal sheet used to form the metal body by applying a slurry comprising a solvent, polyethylene, and the antimicrobial agent to the metal sheet using a reverse-rolling device and then drying to provide the coating on a coated sheet;
   wherein the coated sheet is shaped to form the metal body;
   wherein at least a portion of the antimicrobial agent is exposed on an outside surface of the coating and is available to directly contact microbes on the surface of the coating without requiring polishing;
   wherein the coating is smooth and substantially streak-free;
   wherein the coating is fingerprint resistant and is substantially resistant to water-based material transfer and resists the visible transfer of residue after physical interactions with a user.

2. The trashcan of claim 1, wherein the substantially streak-free coating appears substantially flat.

3. The trashcan of claim 1, wherein the fingerprint resistant material allows fingerprints to be removed by wiping without using a liquid solution.

4. The trashcan of claim 1, wherein 24 hours after an initial bacterial exposure to the coating, an amount of bacteria remaining on the coating is at least about 95% less than at the initial bacterial exposure.

5. The trashcan of claim 1, wherein the coating reduces an amount of E. coli from about $2.3 \times 10^5$ colony forming units (CFU) per 50 mm×50 mm carrier to less than about 5 CFU/carrier over a period of about 24 hours.

6. The trashcan of claim 1, wherein the coating reduces an amount of S. aureus from about $3.85 \times 10^5$ CFU per 50 mm×50 mm carrier to less than about 5 CFU/carrier over a period of about 24 hours.

7. A trashcan comprising:
   a metal body shaped to provide at least a portion of a container that is configured to receive refuse;
   wherein a surface of the metal body comprises a fingerprint resistant coating, the fingerprint resistant coating comprising a polymeric substrate;
   wherein the fingerprint resistant coating is positioned directly on the surface of the metal body;
   wherein the fingerprint resistant coating comprises an antimicrobial agent dispersed within the polymeric substrate;
   wherein the fingerprint resistant coating is applied directly to a metal sheet used to form the metal body by applying a slurry comprising a solvent, a polymeric substrate material, and the antimicrobial agent directly to the metal sheet using a reverse-rolling device and then drying to provide a coated sheet;

wherein the coated sheet is shaped to form the metal body;

wherein at least a portion of the antimicrobial agent is exposed to the surface of the fingerprint resistant coating without requiring polishing and is available to directly contact microbes on the surface of the fingerprint resistant coating;

wherein the fingerprint resistant coating is substantially streak-free;

wherein the fingerprint resistant coating is substantially resistant to water-based material transfer or oil-based material transfer.

8. The trashcan of claim 7, wherein the substantially streak-free coating appears substantially planar.

9. The trashcan of claim 7, wherein the polymeric substrate comprises polyethylene.

10. The trashcan of claim 7, wherein 24 hours after an initial bacterial exposure to the coating, an amount of bacteria remaining on the coating is at least about 95% less than at the initial bacterial exposure.

11. The trashcan of claim 7, wherein the coating reduces an amount of *E. coli* from about $2.3 \times 10^5$ colony forming units (CFU) per 50 mm×50 mm carrier to less than about 5 CFU/carrier over a period of about 24 hours.

12. The trashcan of claim 7, wherein the coating reduces an amount of *S. aureus* from about $3.85 \times 10^5$ CFU per 50 mm×50 mm carrier to less than about 5 CFU/carrier over a period of about 24 hours.

13. The trashcan of claim 7, wherein the reverse-rolling device is non-metered.

14. The trashcan of claim 7, wherein the antimicrobial agent comprises a zeolite.

15. The trashcan of claim 7, wherein the antimicrobial agent comprises ionic silver, ionic copper, and ammonium.

16. The trash can of claim 1, wherein the metal sheet is a stainless steel metal sheet.

17. The trash can of claim 7, wherein the metal is stainless steel metal sheet.

18. A trashcan comprising:

a stainless steel metal body shaped to provide at least a portion of a container that is configured to receive refuse;

wherein a surface of the stainless steel metal body comprises a fingerprint resistant coating, the fingerprint resistant coating comprising a polymeric substrate;

wherein the fingerprint resistant coating is positioned directly on the surface of the stainless steel metal body;

wherein the fingerprint resistant coating comprises an antimicrobial agent dispersed within the polymeric substrate;

wherein the fingerprint resistant coating is applied to a stainless steel metal sheet used to form the stainless steel metal body by applying a slurry comprising a solvent, a polymeric substrate material, and the antimicrobial agent to the stainless steel metal sheet and then drying to provide a coated sheet;

wherein the metal sheet is a stainless steel metal sheet;

wherein the coated sheet is shaped to form the stainless steel metal body;

wherein at least a portion of the antimicrobial agent is exposed to the surface of the fingerprint resistant coating without requiring polishing and is available to directly contact microbes on the surface of the fingerprint resistant coating;

wherein the fingerprint resistant coating is substantially streak-free;

wherein the fingerprint resistant coating is substantially resistant to water-based material transfer or oil-based material transfer.

19. The trashcan of claim 18, wherein the polymeric substrate comprises polyethylene.

20. The trashcan of claim 18, wherein 24 hours after an initial bacterial exposure to the coating, an amount of bacteria remaining on the coating is at least about 95% less than at the initial bacterial exposure.

21. The trashcan of claim 18, wherein the coating reduces an amount of *E. coli* from about $2.3 \times 10^5$ colony forming units (CFU) per 50 mm×50 mm carrier to less than about 5 CFU/carrier over a period of about 24 hours and wherein the coating reduces an amount of *S. aureus* from about $3.85 \times 10^5$ CFU per 50 mm×50 mm carrier to less than about 5 CFU/carrier over a period of about 24 hours.

22. The trashcan of claim 18, wherein the antimicrobial agent comprises a zeolite.

23. The trashcan of claim 18, wherein the antimicrobial agent comprises ionic silver, ionic copper, and ammonium.

24. The trashcan of claim 18, wherein the antimicrobial agent is supported on a nanoparticle.

25. The trashcan of claim 18, wherein the slurry is applied the stainless steel metal sheet using a reverse-rolling device.

* * * * *